(12) United States Patent
Wada et al.

(10) Patent No.: US 7,623,159 B2
(45) Date of Patent: Nov. 24, 2009

(54) SHAKE CORRECTION MECHANISM AND IMAGE SENSING APPARATUS USING THE SAME

(75) Inventors: Shigeru Wada, Kishiwada (JP); Junichi Tanii, Izumi (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 614 days.

(21) Appl. No.: 10/990,864

(22) Filed: Nov. 17, 2004

(65) Prior Publication Data
US 2006/0033818 A1 Feb. 16, 2006

(30) Foreign Application Priority Data
Aug. 12, 2004 (JP) ............... 2004-235017

(51) Int. Cl.
*H04N 5/228* (2006.01)
(52) U.S. Cl. ............... 348/222.1; 348/208.11; 348/205; 348/373; 396/55
(58) Field of Classification Search ............ 348/208.11, 348/205, 373; 396/55
See application file for complete search history.

(56) References Cited

U.S. PATENT DOCUMENTS

| | | | | |
|---|---|---|---|---|
| 5,084,724 A | * | 1/1992 | Maeno | ............. 396/55 |
| 5,153,633 A | * | 10/1992 | Otani | ............. 396/55 |
| 5,397,185 A | | 3/1995 | Meuwese et al. | |
| 5,502,598 A | | 3/1996 | Kimura et al. | |
| 5,671,448 A | * | 9/1997 | Usui | ............. 556/55 |
| 5,708,865 A | * | 1/1998 | Soshi et al. | ............. 396/55 |
| 5,717,960 A | * | 2/1998 | Tomita et al. | ............. 396/55 |
| 5,794,081 A | * | 8/1998 | Itoh et al. | ............. 396/55 |
| 5,907,730 A | * | 5/1999 | Tseng et al. | ............. 396/428 |
| 6,052,240 A | * | 4/2000 | Ikari | ............. 359/819 |
| 6,081,391 A | * | 6/2000 | Nishio et al. | ............. 359/700 |
| 6,154,611 A | * | 11/2000 | Washisu | ............. 396/55 |
| 6,757,011 B1 | * | 6/2004 | Takeda et al. | ............. 348/208.7 |
| 6,885,508 B2 | * | 4/2005 | Yamaguchi et al. | ............. 359/717 |

(Continued)

FOREIGN PATENT DOCUMENTS

JP 4-104666 4/1992

(Continued)

OTHER PUBLICATIONS

Office Action for JP 2004-235017 issued Jul. 4, 2006 with English translation entitled "Notice of Reasons for Rejection," 4 pages.

*Primary Examiner*—Jason Chan
*Assistant Examiner*—Usman Khan
(74) *Attorney, Agent, or Firm*—Brinks Hofer Gilson & Lione

(57) ABSTRACT

A shake correction mechanism 1 has an elastic support member 2 for elastically and oscillatingly supporting a lens barrel 10 at one point, and first and second actuators 3a and 3b for applying oscillating forces to the lens barrel 10. When a moment is applied to the lens barrel 10 by the first and second actuators 3a and 3b, the elastic support member 2 is subjected to elastic deformation. Thereby, the lens barrel 10 is oscillated to tilt the optical axis thereof in a desires direction. Thus, the lens barrel 10 is oscillatingly driven without use of a rotary joint or the like as employed in the conventional gimbal mechanism. This arrangement enables to miniaturize the shake correction mechanism.

20 Claims, 12 Drawing Sheets

U.S. PATENT DOCUMENTS

| | | | |
|---|---|---|---|
| 2001/0004420 A1* | 6/2001 | Kuwana et al. | 396/55 |
| 2002/0159769 A1* | 10/2002 | Fujinaga | 396/55 |
| 2003/0076421 A1* | 4/2003 | Dutta | 348/208.11 |
| 2007/0109412 A1* | 5/2007 | Hara | 348/207.1 |

FOREIGN PATENT DOCUMENTS

| | | |
|---|---|---|
| JP | 6-148494 | 5/1994 |
| JP | 6-221323 | 8/1994 |
| JP | 7-72523 | 3/1995 |
| JP | 07-274056 | 10/1995 |
| JP | 10-285475 | 10/1998 |
| JP | 2000-336697 | 12/2000 |

* cited by examiner

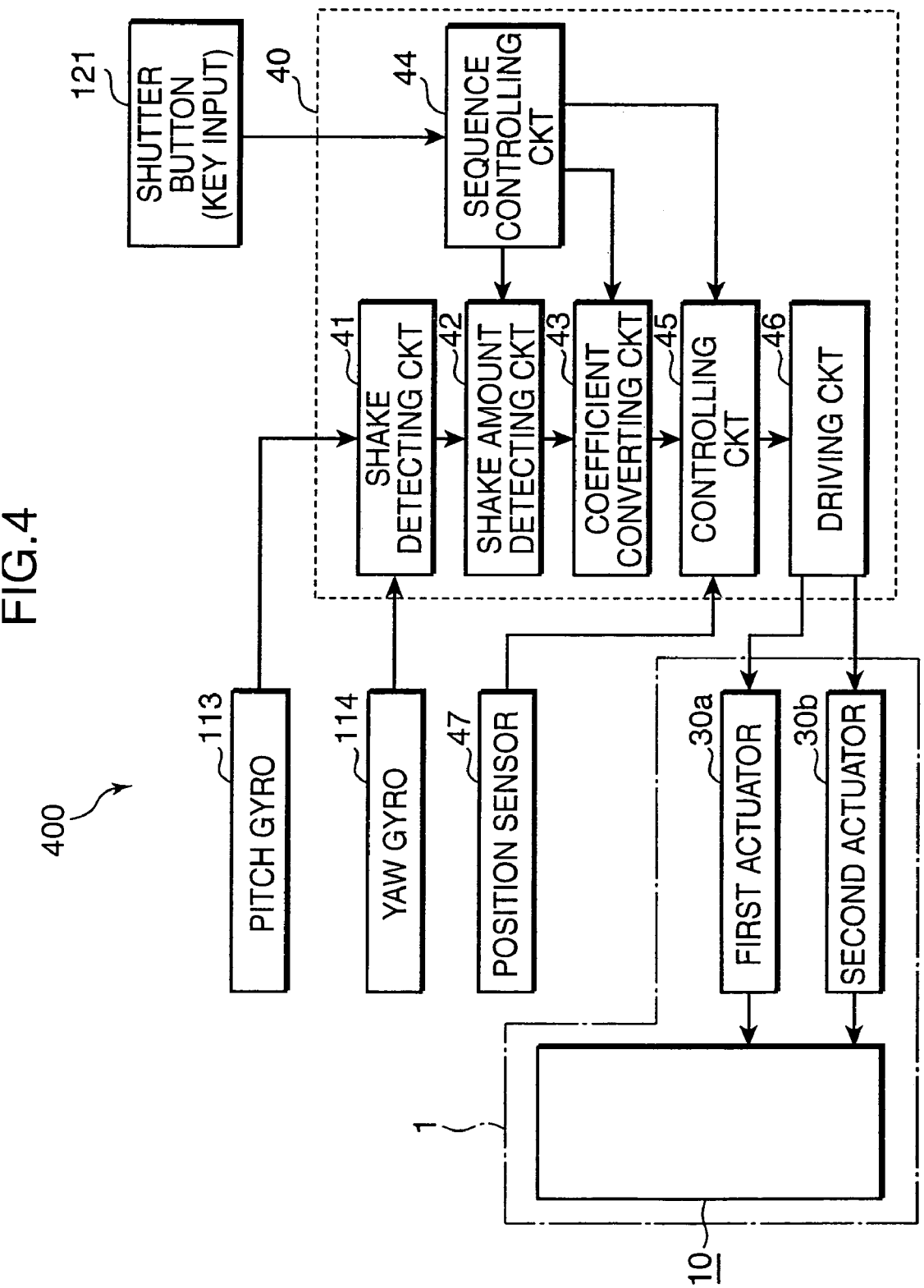

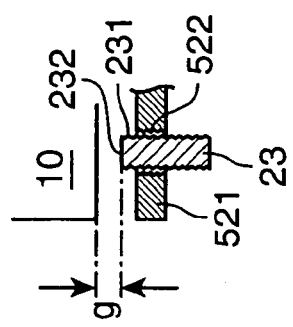
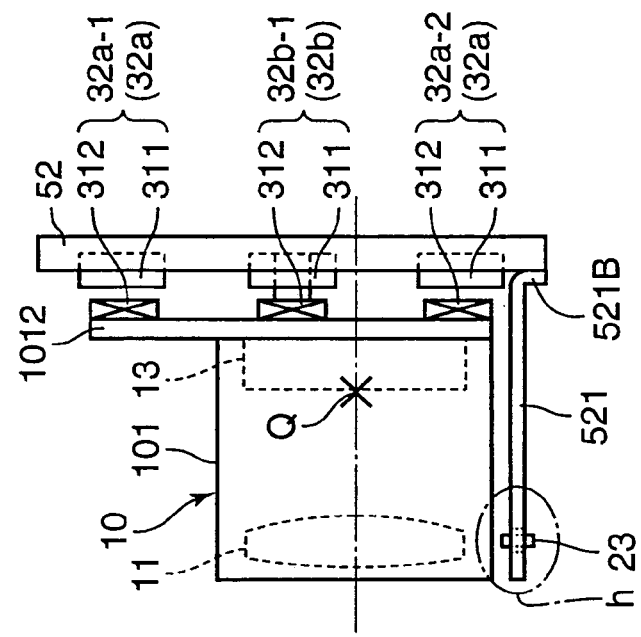
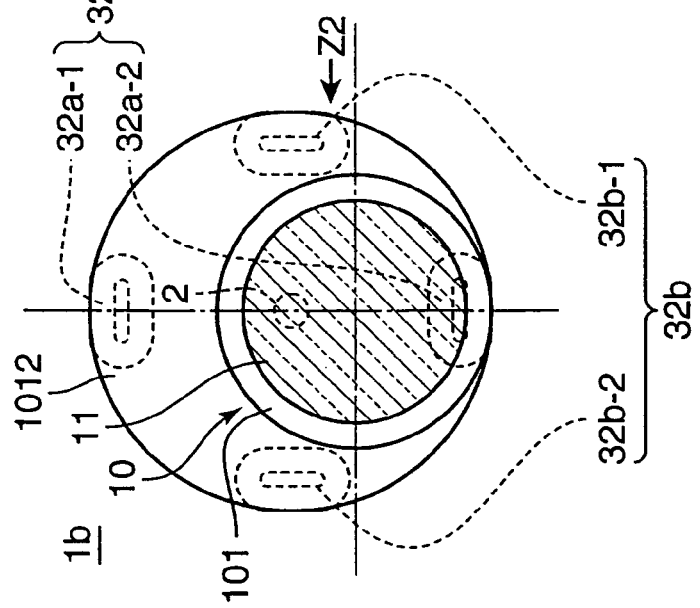

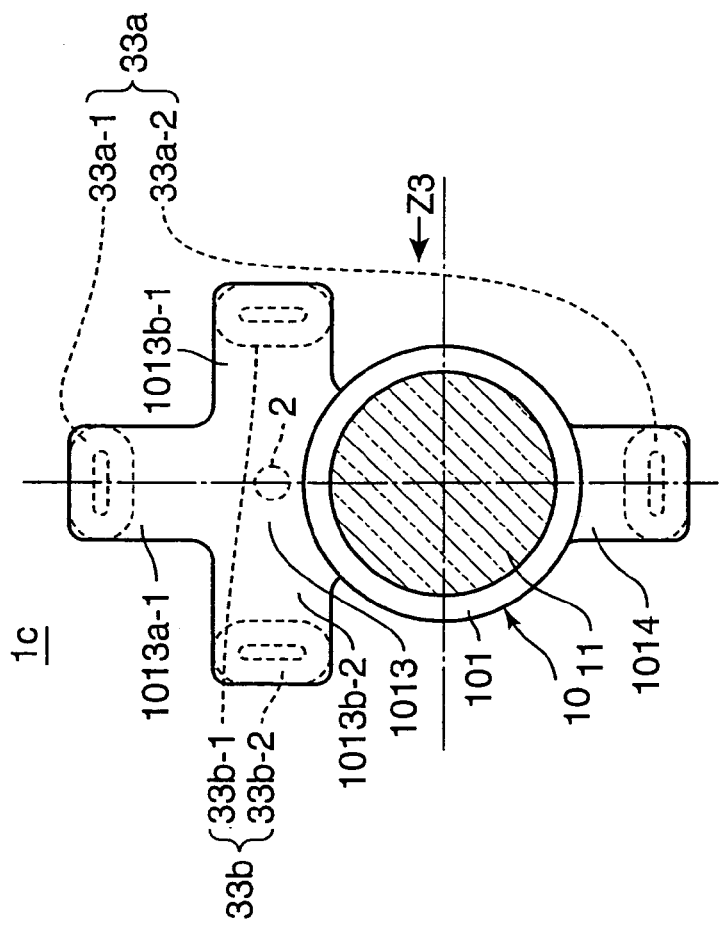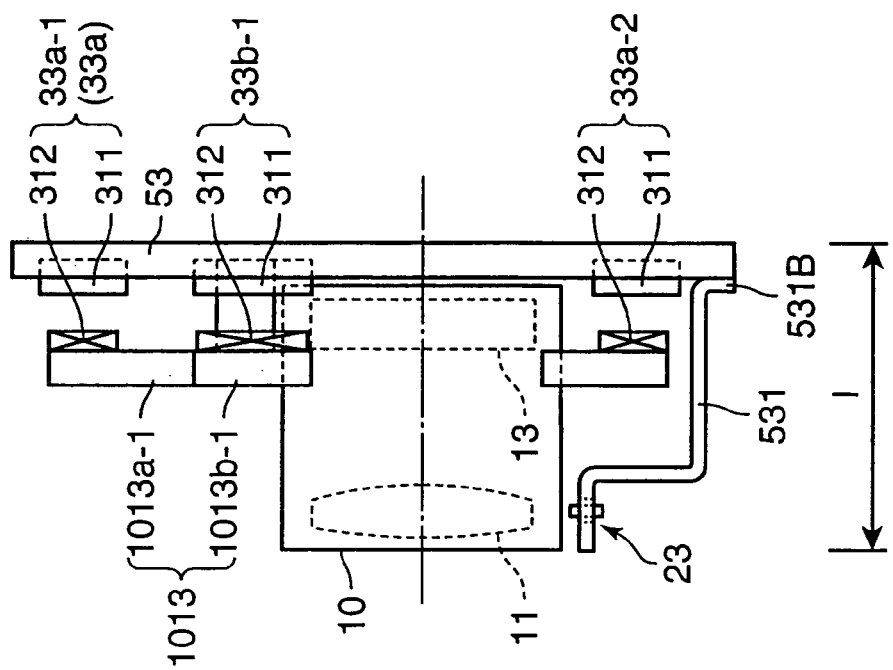

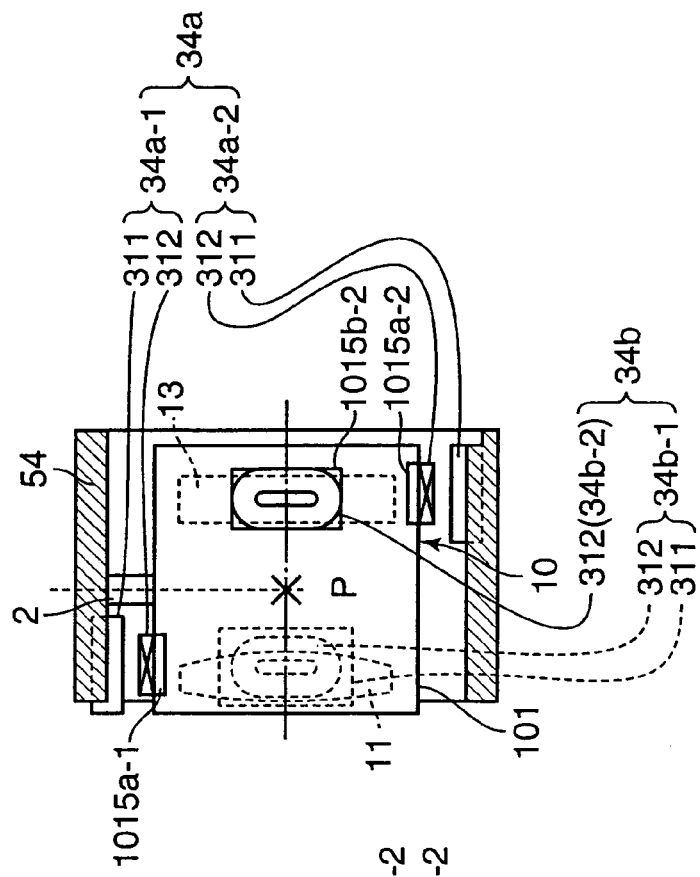
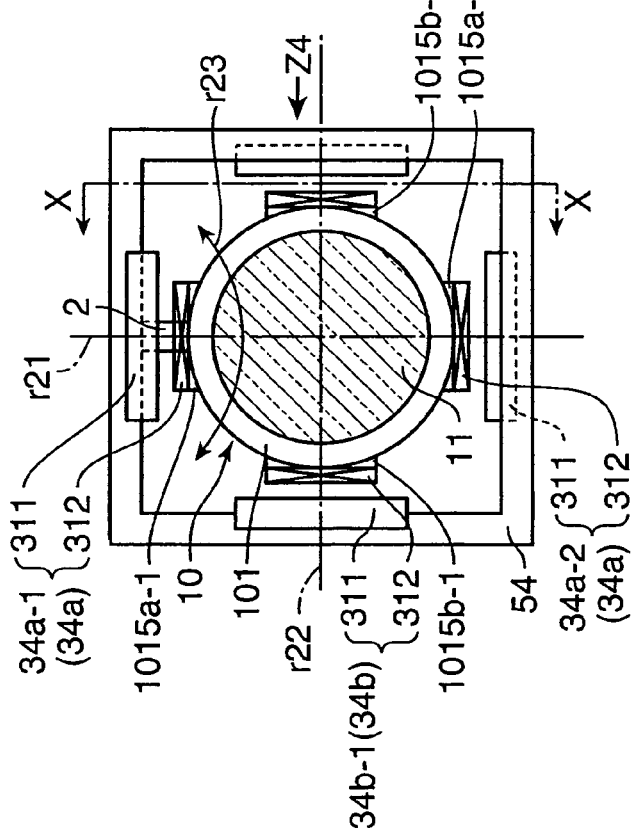

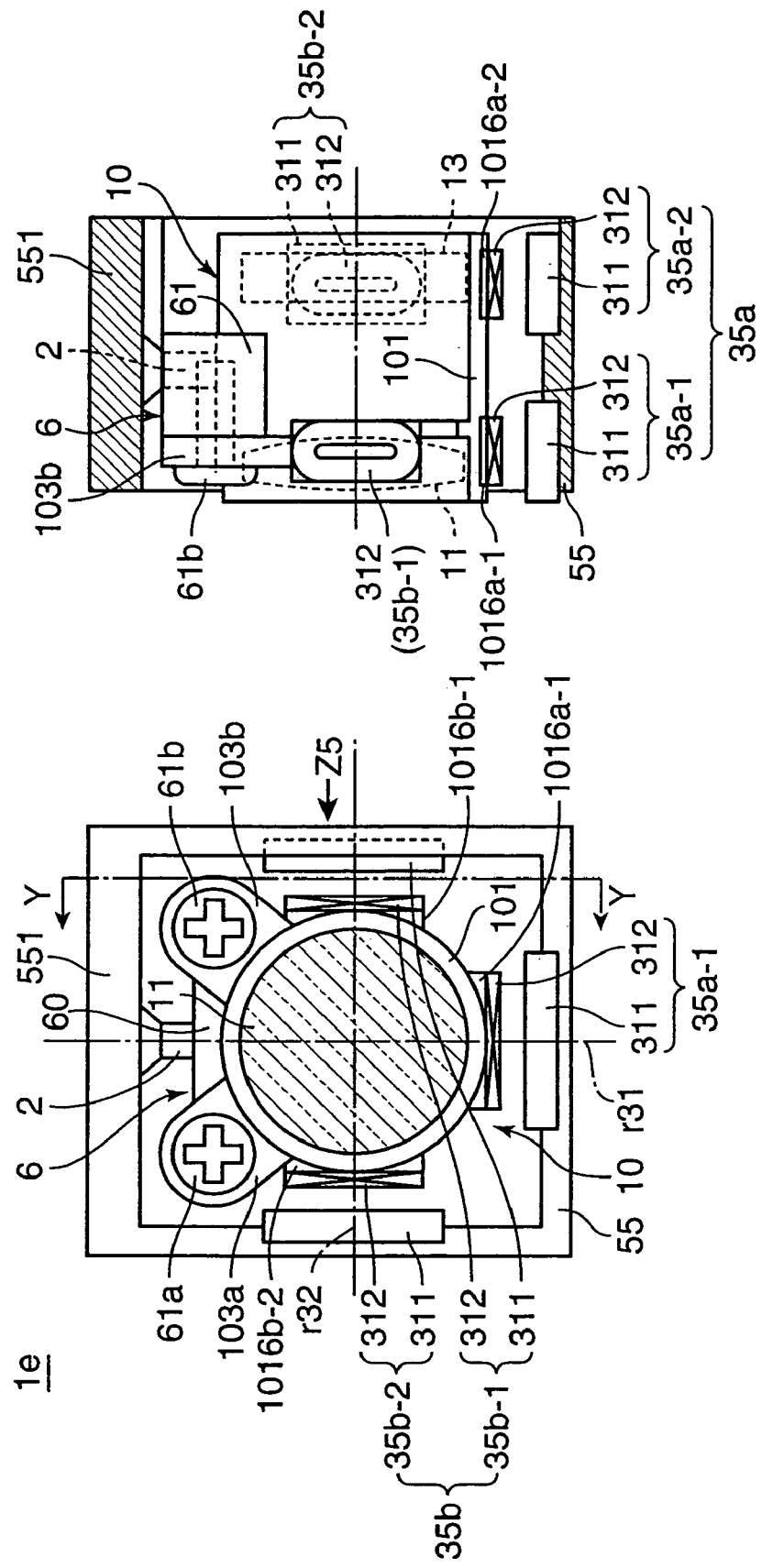

SHAKE CORRECTION MECHANISM AND IMAGE SENSING APPARATUS USING THE SAME

This application is based on Japanese Patent Application No. 2004-235017 filed on Aug. 12, 2004, the contents of which are hereby incorporated by reference.

BACKGROUND OF THE INVENTION

1. Field of the Invention

The present invention relates to a shake correction mechanism adapted as an anti-shake mechanism of a lens barrel, which is equipped in an image sensing apparatus such as a digital camera and a camera phone, and to an image sensing apparatus provided with the shake correction mechanism.

2. Description of the Related Art

Various types of anti-shake mechanisms (shake correction mechanisms) are incorporated in digital cameras or like apparatuses to suppress photographing failure arising from hand shake of the user or the like. Heretofore, the following shake correction mechanisms have been put into practice. Japanese Unexamined Patent Publication No. HEI 7-274056 (hereinafter, called as "D1") discloses an arrangement in which a lens barrel is pivotally supported by a so-called gimbal mechanism. Japanese Unexamined Patent Publication No. HEI 5-66444 (called as "D2") discloses an arrangement in which a lens group disposed inside a lens barrel is driven on a plane perpendicular to the optical axis of the lens group in such a direction as to cancel camera shake. Japanese Unexamined Patent Publication No. 2003-110919 (called as "D3") discloses an arrangement in which a solid-state image sensor such as a CCD sensor is driven on a plane perpendicular to the optical axis of a lens group provided in a lens barrel without driving the lens group.

Recently, miniaturization of image sensing apparatuses is a trend. As such a trend is widespread, the space available for the lens barrel is narrowed. Particularly, there is a strong demand for miniaturization of camera phones or like apparatuses. Naturally, miniaturization of a shake correction mechanism is demanded in the case where an anti-shake mechanism is mounted in such a miniaturized image sensing apparatus.

In the arrangement of D1 employing the gimbal mechanism, it is necessary to dispose a freely-rotatable joint or an equivalent member in two directions with respect to the lens barrel so as to pivotally support the lens barrel. Therefore, the size of the shake correction mechanism is inevitably increased. If miniaturization is attempted in the arrangement of D1, rigidity of bearing portions of the rotary joints or the like may not be secured. In the arrangement of D2 in which the lens group is driven on the plane perpendicular to the optical axis, two stages for moving the lens in parallel are required, which obstructs the miniaturization. Furthermore, this arrangement entails minimizing sensitivity of optical performance such as parallel displacement or tilt displacement of the lens group, which deprives the camera of flexibility in optical designing. Thereby, the size of the lens barrel may be increased, and sufficient anti-shake performance is not obtainable. In the arrangement of D3 in which the solid-state image sensor itself is driven, two stages for driving the image sensor in parallel are required, as well as the arrangement of D2, which also obstructs the miniaturization.

SUMMARY OF THE INVENTION

In view of the problems residing in the prior art, an object of the present invention is to provide a miniaturization-adaptive shake correction mechanism, which is adapted as an anti-shake mechanism in a compact image sensing apparatus such as a camera phone.

An aspect of the present invention is directed to a shake correction mechanism comprising: a lens barrel; a support mechanism that oscillatingly supports the lens barrel; and an actuator unit that applies an oscillating force to the lens barrel, the support mechanism including an elastic support member that elastically supports the lens barrel at one point thereof, the lens barrel being operative to tilt at least an optical axis thereof when an oscillating force is applied to the lens barrel by the actuator unit, and the elastic support member being subjected to elastic deformation when the oscillating force is applied to the lens barrel by the actuator unit.

These and other objects, features and advantages of the present invention will become more apparent upon reading of the following detailed description along with the accompanying drawings.

BRIEF DESCRIPTION OF THE DRAWINGS

FIGS. 1A through 1C are illustrations showing an arrangement of a shake correction mechanism embodying the present invention, wherein FIG. 1A is a perspective view showing the entire arrangement of the shake correction mechanism, FIG. 1B is an illustration showing a state that a lens barrel is oscillated in a pitch direction, and FIG. 1C is an illustration showing a state that the lens barrel is oscillated in a yaw direction.

FIGS. 2A and 2B are illustrations each showing an external appearance of a camera phone to which the shake correction mechanism of the present invention is applied, wherein FIG. 2A is a perspective view showing a front face (operating portion) of the camera phone, and FIG. 2B is a perspective view showing a back face of the camera phone.

FIG. 4 is a block diagram showing an example of the shake correction mechanism.

FIGS. 5A and 5B are illustrations showing a shake correction mechanism as a first embodiment of the present invention, wherein FIG. 5A is a front view, and FIG. 5B is a side view, viewed from the direction of the arrow Z1 in FIG. 5A.

FIGS. 7A through 7C are illustrations showing a shake correction mechanism as a second embodiment of the present invention, wherein FIG. 7A is a front view, FIG. 7B is a side view, viewed from the direction of the arrow Z2 in FIG. 7A, and FIG. 7C is a partially enlarged cross-sectional view of the portion h in FIG. 7B.

FIGS. 8A and 8B are illustrations showing a shake correction mechanism as a third embodiment of the present invention, wherein FIG. 8A is a front view, and FIG. 8B is a side view, viewed from the direction of the arrow Z3 in FIG. 8A.

FIGS. 9A and 9B are illustrations showing a shake correction mechanism as a fourth embodiment of the present invention, wherein FIG. 9A is a front view, and FIG. 9B is a side view, viewed from the direction of the arrow Z4 in FIG. 9A.

FIGS. 10A and 10B are illustrations showing a shake correction mechanism as a fifth embodiment of the present invention, wherein FIG. 10A is a front view, and FIG. 10B is a side view, viewed from the direction of the arrow Z5 in FIG. 10A.

FIGS. 11A and 11B are illustrations showing a shake correction mechanism provided with a rotation regulating unit, wherein FIG. 11A is a front view, and FIG. 11B is a side view, viewed from the direction of the arrow Z6 in FIG. 11A.

FIGS. 12A and 12B are illustrations showing an altered shake correction mechanism provided with a rotation regulating unit, wherein FIG. 12A is a front view, and FIG. 12B is a side view, viewed from the direction of the arrow Z7 in FIG. 12A.

DETAILED DESCRIPTION OF THE PREFERRED EMBODIMENTS

In the following, preferred embodiments of the present invention are described referring to the accompanying drawings.

(Brief Description on the Embodiments)

First, the embodiments of the present invention are described briefly.

(1) According to an embodiment of the present invention, a shake correction mechanism comprises: a lens barrel; a support mechanism that oscillatingly supports the lens barrel; and an actuator unit that applies an oscillating force to the lens barrel, the support mechanism including an elastic support member that elastically supports the lens barrel at one point thereof, the lens barrel being operative to tilt at least an optical axis thereof when an oscillating force is applied to the lens barrel by the actuator unit, and the elastic support member being subjected to elastic deformation when the oscillating force is applied to the lens barrel by the actuator unit.

Figure 1A:
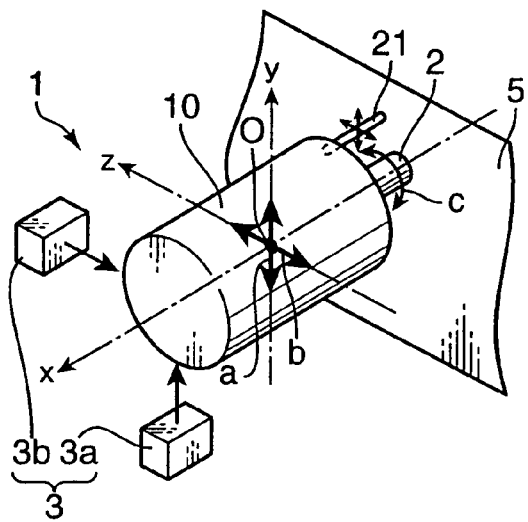
Figure 1B:
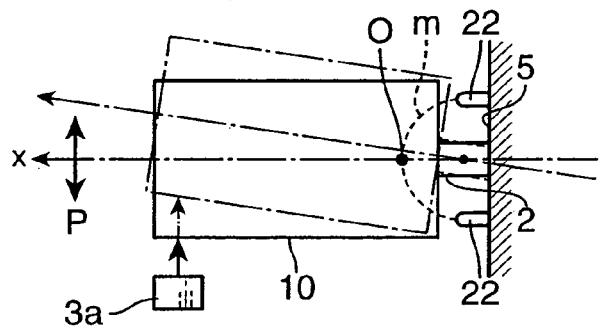
Figure 1C:
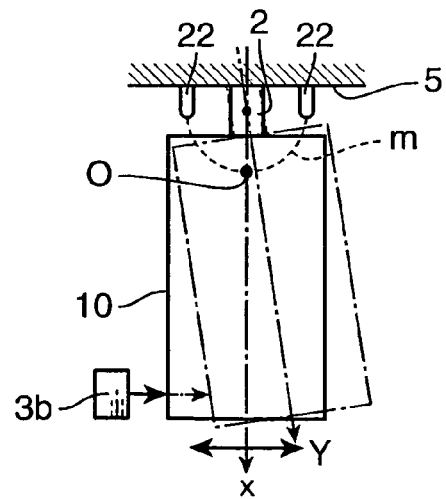

FIGS. 1A through 1C are illustrations schematically showing the arrangement of the shake correction mechanism. The operation of the shake correction mechanism is described referring to FIGS. 1A through 1C. As shown in FIG. 1A, the shake correction mechanism 1 comprises a lens barrel 10, a support mechanism 2a (see FIG. 6) including an elastic support member 2 which elastically and oscillatingly supports the lens barrel 10 at one point, and an actuator unit 3 which applies an oscillating force to the lens barrel 10. The elastic support member 2 is a support member having three latitudes, and oscillatingly supports the lens barrel 10 at one point relative to an unmovable base block 5, so that the lens barrel 10 swings back and forth in three directions, namely, y-axis direction shown by the arrows a in FIG. 1A, z-axis direction shown by the arrows b in FIG. 1A, and about x-axis (optical axis of the lens barrel 10) shown by the arrows c in FIG. 1A. In the embodiments of the present invention, the latitude in the directions shown by the arrows c may be omitted, as far as a latitude to tilt the optical axis of the lens barrel 10, e.g., in the directions shown by the arrows a and b is secured by the elastic support member 2.

The arrangement of the actuator unit 3 is not specifically limited, as far as it can drive the lens barrel 10 at least in two different axial directions, preferably, axial directions orthogonal to each other at a high speed in response to vibrations exerted on the lens barrel 10. For instance, as shown in FIG. 1A, the actuator unit 3 may comprise a first actuator 3a which applies an oscillating force to the lens barrel 10 in the directions shown by the arrows a, and a second actuator 3b which applies an oscillating force to the lens barrel 10 in the directions shown by the arrows b. Examples of the first actuator 3a (second actuator 3b) include an actuator incorporated with a moving coil for applying an oscillating force in one of the two axial directions, an actuator incorporated with a small electric motor, and a gear mechanism, a ball screw mechanism, or an equivalent mechanism, an actuator incorporated with a piezoelectric element, and an actuator incorporated with a pressure mechanism.

FIG. 1B is an illustration schematically showing a state that the lens barrel 10 is oscillated in the pitch direction shown by the arrows P in FIG. 1B (up and down directions) by the first actuator 3a. When the lens barrel 10 is oscillated in the pitch direction, the elastic support member 2 is subjected to bending deformation in the directions shown by the arrows a (see FIG. 1A) by the oscillating force applied to the lens barrel 10 by the first actuator 3a. FIG. 1C is an illustration schematically showing a state that the lens barrel 10 is oscillated in the yaw direction shown by the arrows Y in FIG. 1C (left and right directions) by the second actuator 3b. When the lens barrel 10 is oscillated in the yaw direction, the elastic support member 2 is subjected to bending deformation in the directions shown by the arrows b (see FIG. 1A) by the oscillating force applied to the lens barrel 10 by the second actuator 3b. In an actual operation, the elastic support member 2 is elastically deformed in a combined direction of the arrows a and b by complex operations of the first and second actuators 3a and 3b, thereby causing the lens barrel 10 to oscillate in a desired direction.

According to the above arrangement, the shake correction mechanism is constructed such that the lens barrel is elastically supported at one point by the elastic support member, and the elastic support member is subjected to elastic deformation by causing the actuator unit to apply the oscillating force to the lens barrel, whereby shake correction of the lens barrel is executed. Thus, the lens barrel is oscillatingly supported without use of a rotary joint or the like, as employed in the conventional gimbal mechanism, which contributes to miniaturization of the shake correction mechanism. This arrangement makes it easy to mount the lens barrel equipped with the shake correction mechanism in a limited space of a camera phone, for instance.

(2) Preferably, a shake correction mechanism is the shake correction mechanism (1), further comprising a rotation regulating unit that regulates a rotation amount of the lens barrel about an axis parallel with the optical axis of the lens barrel, the axis including the support point of the lens barrel by the elastic support member.

As mentioned above, the lens barrel 10 is elastically supported at one point by the elastic support member 2, and the elastic support member 2 has thee latitudes. When the lens barrel 10 is oscillated in the directions shown by he arrows c about the optical axis of the lens barrel 10, an image to be photographed may be rotatingly displaced in the arrangement that an image sensor is integrally loaded in the lens barrel 10. In view of this, it is desirable to keep the lens barrel 10 from oscillating in the directions shown by the arrows c.

It is possible to suppress oscillation of the lens barrel 10 in the directions shown by the arrows c by optimizing the balance between the actuators 3a and 3b, for instance. However, as shown in FIG. 1A, it is desirable to provide a rotation regulating unit 21 for regulating the rotation amount of the lens barrel 10 in order to securely and easily suppress oscillation of the lens barrel 10 in the directions shown by the arrows c. The rotation regulating unit 21 for keeping the lens barrel 10 from oscillating (rotating) in the directions shown by the arrows c is obtained by, for instance, engaging a part of the lens barrel 10 with an unmovable member such as the base block 5. The configuration of the rotation regulating unit 21 is not limited, as far as the rotation regulating unit 21 has flexibility to allow tilt of the lens barrel 10 in the directions shown by the arrows a and b.

According to the above arrangement, the rotation regulating unit for regulating the rotation amount of the lens barrel allows the lens barrel to exclusively oscillate in the directions as to tilt the optical axis of the lens barrel. In this arrangement, the lens barrel is oscillated merely in the directions to execute the shake correction, despite that the support mechanism of elastically supporting the lens barrel at one point is adopted. This arrangement eliminates a rotary displacement of an image to be photographed, which may take place if the image sensor is integrally loaded in the lens barrel, thus allowing effective anti-shake control.

(3) Preferably, a shake correction mechanism is the shake correction mechanism (2), further comprising an unmovable base block wherein the rotation regulating unit includes a shaft member and a guide member that guides the shaft member, and the shaft member is pivotally supported on the base block or the lens barrel, and the shaft member is integrally formed with an outer wall of the lens barrel or the base block.

In the above arrangement, the lens barrel 10 is tilted in the directions shown by the arrows a and b while being supported by the pivotal shaft member, with oscillation of the lens barrel 10 in the directions shown by the arrows c being restrained by engagement of the shaft member and a shaft receiving member.

According to the above arrangement, the rotary displacement of the lens barrel is restrained with the simplified construction that the shaft member is engaged in the shaft receiving member. Thereby, a rotation restraining function is provided in the lens barrel without obstructing miniaturization of the shake correction mechanism.

(4) Preferably, a shake correction mechanism is the shake correction mechanism (1), further comprising a tilt regulating member that regulates a tilt range of the lens barrel with respect to the optical axis of the lens barrel.

The lens barrel 10 is desirably oscillated in such a direction as to tilt the optical axis of the lens barrel 10, namely, in the directions shown by the arrows a and b. If, however, the lens barrel 10 is oscillated over an allowable range, for instance, if the elastic support member 2 is subjected to an excessive deformation due to application of a large impact, the lens barrel 10 may be subjected to permanent deformation and broken. In view of this, it is desirable to provide the tilt regulating member for regulating a tilt range of the lens barrel 10 to thereby protect the elastic support member 2 from an external force such as an impact. In FIGS. 1B and 1C, pins 22 as an example of the tilt regulating members are provided on the surface of the base block 5 such that the pin 22 is allowed to contact the bottom surface of the lens barrel 10 when the lens barrel 10 is tilted over the allowable range of the tilt angle.

According to the above arrangement, since the oscillation range of the lens barrel is regulated by the tilt regulating member, even if a force over the elastic limit of the elastic support member is acted on the elastic support member, as a result of exertion of an impact or a like external force on the lens barrel, the elastic support member is kept from breakage. Thus, an impact resistive shake correction mechanism is provided despite that the lens barrel is elastically supported at one point by the elastic support member.

(5) Preferably, a shake correction mechanism is the shake correction mechanism (4), wherein the tilt regulating member includes a pin that is arranged as opposed to a part of the lens barrel for contact with the part of the lens barrel, and the pin is arranged on an oscillation trajectory along which a centroid of the lens barrel is moved relative to the support point of the lens barrel by the elastic support member.

As shown in FIGS. 1B and 1C, when the lens barrel 10 is oscillated with the point O as the centroid of the lens barrel 10, the centroid O is moved along the predetermined oscillation trajectory m with the support point of the lens barrel 10 by the elastic support member 2 serving as the center of oscillation.

Providing the pins 22 serving as the tilt regulating members on or near the oscillation trajectory m enables to allow the pins 22 to directly receive the oscillating force of the centroid O of the lens barrel 10. This effectively suppresses secondary oscillation of the lens barrel 10 after collision against the pin 22, which contributes to provide an improved buffer effect.

According to the above arrangement, providing the pins serving as the tilt regulating members on the oscillation trajectory along which the centroid of the lens barrel is moved enables to effectively suppress secondary oscillation of the lens barrel after collision against the pin. Thereby, a further improved impact resistive shake correction mechanism is provided.

(6) Preferably, a shake correction mechanism is the shake correction mechanism (4), wherein the tilt regulating member includes a pin that is arranged as opposed to the part of the lens barrel for contact with the part of the lens barrel at or around a point farthest away from the support point of the lens barrel by the elastic support member.

In the above arrangement, since the tilt regulating member is disposed at or around the farthest point from the support point of the lens barrel by the elastic support member, it is easy to adjust the oscillation angle.

According to the above arrangement, since the tilt regulating member is disposed at or around the farthest point from the support point of the lens barrel by the elastic support member, the oscillation angle can be adjusted easily. Namely, a desired oscillation angle can be set by merely regulating the gap defined by the pin and the lens barrel.

(7) Preferably, a shake correction mechanism is any one of the shake correction mechanisms (1) through (6), wherein the lens barrel is supported by the elastic support member at one point on a bottom surface thereof, and the actuator unit includes a first actuator that oscillates the lens barrel along a first plane which includes the support point of the lens barrel by the elastic support member and extends in a direction of the optical axis of the lens barrel, and a second actuator that oscillates the lens barrel along a second plane which includes the support point of the lens barrel by the elastic support member and intersects perpendicular to the first plane.

According to the above arrangement, the shake correction mechanism can be produced with a simplified and sophisticated construction in the embodiment that the lens barrel is supported at one point on the bottom surface thereof by the elastic support member.

(8) Preferably, a shake correction mechanism is the shake correction mechanism (7), further comprising a base block as an attachment base for the lens barrel wherein the first actuator and the second actuator each comprises a moving coil unit including a magnet and a coil, either one of the magnet and the coil of the moving coil unit is attached to a flange portion formed on a rear end portion of the lens barrel, and the other one of the coil and the magnet of the moving coil unit is attached to the base block.

According to the above arrangement, the shake correction mechanism can be produced with a simplified and sophisticated construction with use of the actuators each comprising the moving coil unit in the embodiment that the lens barrel is supported at one point on the bottom surface thereof by the elastic support member.

(9) Preferably, a shake correction mechanism is the shake correction mechanism (7), wherein the support point of the lens barrel by the elastic support member is disposed away from the bottom surface of the lens barrel.

In the above arrangement, since the elastic support member is disposed away from the bottom surface of the lens barrel, the height of the shake correction mechanism can be reduced.

According to the above arrangement, the height of the shake correction mechanism can be reduced in the embodiment that the lens barrel is supported at one point on the bottom surface thereof by the elastic support member. This arrangement is advantageous in mounting the shake correction mechanism in a compact camera phone or a like apparatus generally having a small thickness.

(10) Preferably, a shake correction mechanism is any of the shake correction mechanisms (1) through (6), wherein the lens barrel is supported by the elastic support member at one point substantially in an axial middle on a side wall thereof, and the actuator unit includes a first actuator that oscillates the lens barrel along a first plane which includes the support point of the lens barrel by the elastic support member and the optical axis of the lens barrel, and extends in a direction of the optical axis of the lens barrel, and a second actuator that oscillates the lens barrel along a second plane which includes the optical axis of the lens barrel and intersects perpendicular to the first plane.

According to the above arrangement, the shake correction mechanism can be produced with a simplified and sophisticated construction in the embodiment that the lens barrel is supported at one point substantially in the axial middle on the side wall thereof by the elastic support member.

(11) Preferably, a shake correction mechanism is the shake correction mechanism (10), further comprising a base block as an attachment base for the lens barrel, the base block having a frame-like shape in plan view and surrounding the lens barrel wherein the first actuator and the second actuator each comprises a moving coil unit including a magnet and a coil, either one of the magnet and the coil of the moving coil unit is attached to a mounting portion formed on the side wall of the lens barrel, and the other one of the coil and the magnet of the moving coil unit is attached to an inner wall of the base block.

According to the above arrangement, the shake correction mechanism can be produced with a simplified and sophisticated construction with use of the actuators each comprising the moving coil unit in the embodiment that the lens barrel is supported at one point substantially in the axial middle on the side wall thereof by the elastic support member.

(12) Preferably, a shake correction mechanism is any of the shake correction mechanisms (1) through (11), further comprising an image sensor integrally loaded in the lens barrel.

In the above arrangement, the image sensor is oscillated together with the oscillated lens barrel.

According to the above arrangement, since the image sensor is oscillated together with the oscillated lens barrel, an additional oscillation mechanism for oscillating the image sensor is not required, which contributes to miniaturization of the shake correction mechanism.

(13) Preferably, a shake correction mechanism is any of the shake correction mechanisms (1) through (12), further comprising a lens barrel holding member that holds the lens barrel thereon, wherein the lens barrel holding member is elastically supported by the elastic support member.

In the above arrangement, the lens barrel is indirectly supported by way of the lens barrel holding member, in place of being directly supported by the elastic support member.

According to the above arrangement, since the lens barrel is indirectly supported by way of the lens barrel holding member, in place of being directly supported by the elastic support member, the interlock mechanism of interlocking the elastic support member to the lens barrel can be simplified. Further, since the support mechanism can be integrally formed along with the lens barrel holding member, the construction of the support mechanism can be further simplified.

(14) According to an embodiment of the present invention, an image sensing apparatus comprises: a main body of the image sensing apparatus; an image sensing section including a lens barrel; a swing angle detector that detects a swing angle of the lens barrel relative to the main body; a shake correction controller that generates a shake correction control signal based on the detected swing angle; and a shake correction mechanism controlled by the shake correction controller, wherein the shake correction mechanism is any of the shake correction mechanisms (1) through (13).

According to the above arrangement, provided is the image sensing apparatus equipped with the shake correction mechanism having the aforementioned advantages.

(Entire Construction)

In the following, the preferred embodiments of the present invention are described in detail referring to the drawings.

Figure 2A:
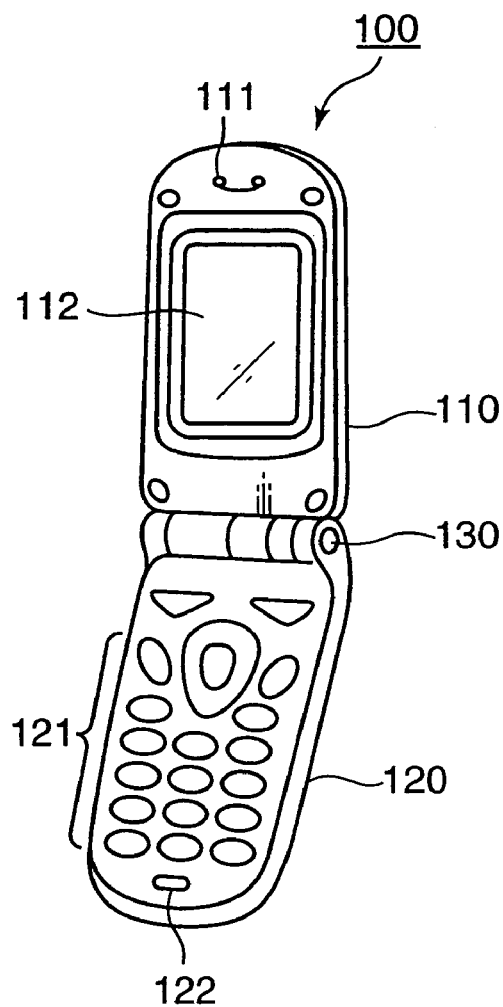
Figure 2B:
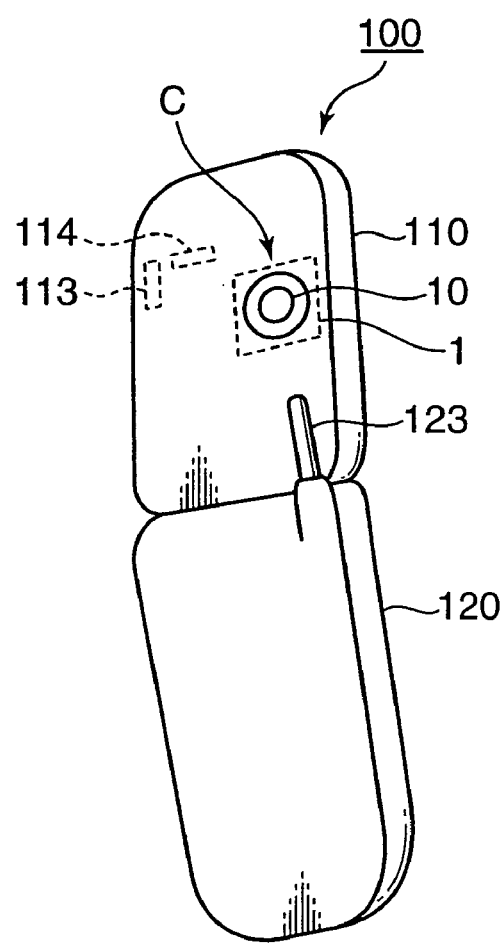

FIGS. 2A and 2B are illustrations each showing an external appearance of a camera phone 100 to which the shake correction mechanism 1 embodying the present invention is applied. The shake correction mechanism 1 or anti-shake mechanism embodying the present invention is mounted in the camera phone 100, so that the lens barrel 10 built in the camera phone 100 has an anti-shake function. The shake correction mechanism is adapted for a lens-barrel-built-in digital still camera, digital video camera, personal digital assistant (PDA) or the like, as well as the camera phone 100.

FIG. 2A is a perspective view showing a front face (operating portion) of the camera phone 100, and FIG. 2B is a perspective view showing a rear face thereof. As shown in FIG. 2A, the camera phone 100 has a foldable structure such that a first frame 110 and a second frame 120 are interlocked to each other by a hinge member 130. A speaker 111 serving as a receiver, and a liquid crystal display (LCD) 112 serving as a display for displaying various information are arranged on the front face of the first frame 110. A key input section 121 and a microphone 122 are arranged on the front face of the second frame 120. As shown in FIG. 2B, an image sensing section (camera section) C provided with the shake correction mechanism 1 of the lens barrel 10 is built in the rear face of the first frame 110 in such a manner that the lens is exposed. A gyro 113 (hereinafter, called as "pitch gyro 113") and a gyro 114 (hereinafter, called as "yaw gyro 114") for detecting a shake exerted on the camera phone 100 are built in the camera phone 100. An antenna 123 is arranged at an appropriate position on the rear face of the second frame 120.

The key input section 121 includes, as well as various dial buttons for activating the functions of the camera phone 100 as a mobile phone, a mode setting button for starting up the photographing mode and switching the camera phone 100 between still image photography and moving image photography, a magnification button for controlling magnification (zooming) operation of an optical assembly provided in the lens barrel 10, and a shutter button for executing photographing operation. The magnification button is not provided if the optical assembly is of fixed focus type.

Figure 3:
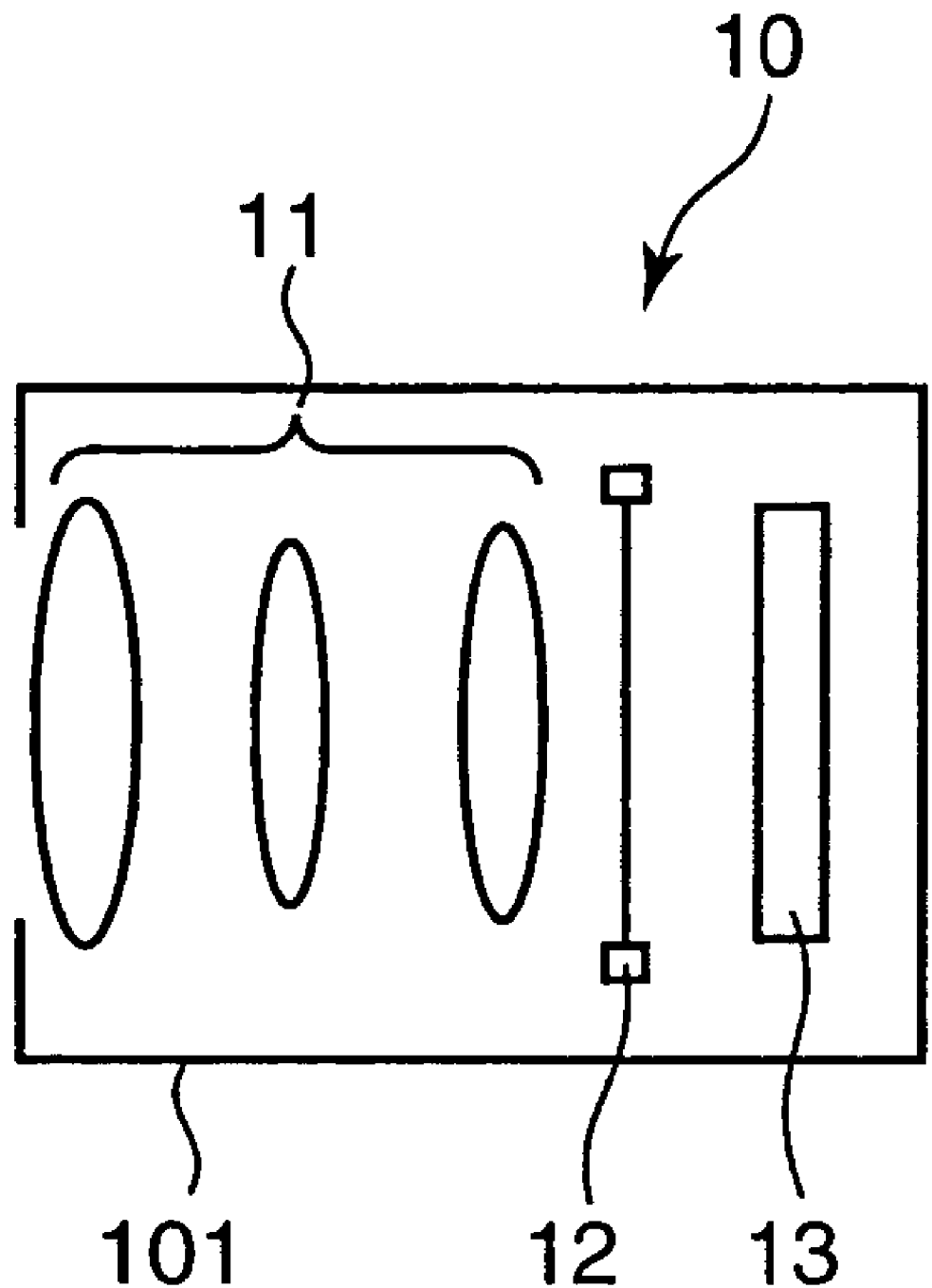
FIG. 3 is a cross-sectional view showing an example of the lens barrel.

FIG. 3 is a cross-sectional view schematically showing an internal structure of the lens barrel 10. An outer body 101 of the lens barrel 10 accommodates therein a lens array 11 for focusing an optical image of an object to be photographed, a parallel plate member 12 corresponding to an optical low pass filter or the like, and an image sensor 13 for converting the optical image focused by the lens array 11 to an electrical signal in this order from the side of the object to be photographed. The lens barrel 10 is oscillatingly driven by actuators in response to vibrations detected by the pitch gyro 113 and the yaw gyro 114 for anti-shake control.

FIG. 4 is a block diagram exemplarily showing a shake correction unit 400 incorporated in the camera phone 100 for implementing the anti-shake function. The shake correction unit 400 includes the shutter button (key input section 121), the pitch gyro 113 and the yaw gyro 114 (swing angle detector) for detecting vibrations exerted on the camera phone 100, a shake correction controller 40 constituted of various circuit blocks on a substrate, the lens barrel 10 which is oscillatingly driven by the actuators, the first actuator 30a for applying an oscillating force to the lens barrel 10 to tilt the optical axis of the lens barrel 10 in a first direction (e.g., pitch direction), the second actuator 30b for applying an oscillating force to the lens barrel 10 to tilt the optical axis in a second direction (e.g., yaw direction), and a position sensor 47. The shake correction controller 40 has a shake detecting circuit 41, a shake amount detecting circuit 42, a coefficient converting circuit 43, a sequence controlling circuit 44, a controlling circuit 45, and a driving circuit 46.

The pitch gyro 113 is a gyro sensor for detecting a shake of the camera phone 100 in the pitch direction, and the yaw gyro 114 is a gyro sensor for detecting a shake of the camera phone 100 in the yaw direction. The gyro sensor used in the embodiment is adapted to detect an angular velocity of an object whose shake is to be canceled (in the embodiment, the camera phone 100) in the case where the object swings or pivotally moves due to hand shake of the user or the like.

A pitch angular velocity signal which is detected by the pitch gyro 113 and indicative of an angular velocity of the camera phone 100 in the pitch direction, and a yaw angular velocity signal which is detected by the yaw gyro 114 and indicative of an angular velocity of the camera phone 100 in the yaw direction are outputted to the shake detecting circuit 41 of the shake correction controller 40. The shake detecting circuit 41 includes a filter circuit (low-pass filter, and high-pass filter) for reducing noises and drifts of the respective angular velocity signals, and an amplifying circuit for amplifying the respective angular velocity signals.

The respective angular velocity signals outputted from the shake detecting circuit 41 are inputted to the shake amount detecting circuit 42, which, in turn, reads the respective angular velocity signals at a predetermined time interval, and outputs, to the coefficient converting circuit 43, shake amounts (detx, dety) in the pitch direction and in the yaw direction. The coefficient converting circuit 43 converts the respective shake amounts (detx, dety) outputted from the shake amount detecting circuit 42 to movement amounts (px, py) in the pitch and yaw directions, namely, movement amounts by which the lens barrel 10 is to be oscillatingly driven by the first actuator 30a and the second actuator 30b, respectively.

The signals indicative of the respective movement amounts (px, py) in the pitch and yaw directions are outputted from the coefficient converting circuit 43 to the controlling circuit 45. Then, the controlling circuit 45 converts the signals indicative of the respective movement amounts (px, py) in the pitch and yaw directions to actual drive signals (drvx, drvy), considering the position data sent from the position sensor 47 which detects the position of the lens barrel 10, operating characteristics of the first and second actuators 30a, 30b, or other factor. The drive signals (drvx, drvy) generated in the controlling circuit 45 are outputted to the driving circuit (driver) 46 for actually driving the first and second actuators 30a and 30b, as correction amount signals indicative of movement amounts of the lens barrel 10 for shake correction.

The operations of the shake amount detecting circuit 42, the coefficient converting circuit 43, and the driving circuit 45 are controlled by the sequence controlling circuit 44. Specifically, in response to pressing of the shutter button, the sequence controlling circuit 44 controls the shake amount detecting circuit 42 to read data signals relating to the respective shake amounts (detx, dety) in the pitch and yaw directions. Next, the sequence controlling circuit 44 controls the coefficient converting circuit 43 to convert the respective shake amounts (detx, dety) to the respective movement amounts (px, py). Lastly, the sequence controlling circuit 44 controls the controlling circuit 45 to calculate the correction amounts by which the lens barrel 10 is to be correctively driven, based on the respective movement amounts (px, py). The above sequential operations are repeated at a predetermined time interval during a period from pressing of the shutter button to completion of the exposure for anti-shake control of the lens barrel 10.

The present invention is, for example, directed to the shake correction mechanism 1 comprising the support mechanism 2a for oscillatingly supporting the lens barrel 10, and the actuator unit 3 (first actuator 30a, and second actuator 30b) for applying an oscillating force to the lens barrel 10. The shake correction mechanism 1 functions as part of the shake correction unit 400 incorporated in the camera phone 100.

In the following, various embodiments of the shake correction mechanism 1 will be described in detail.

First Embodiment

Figure 5A:
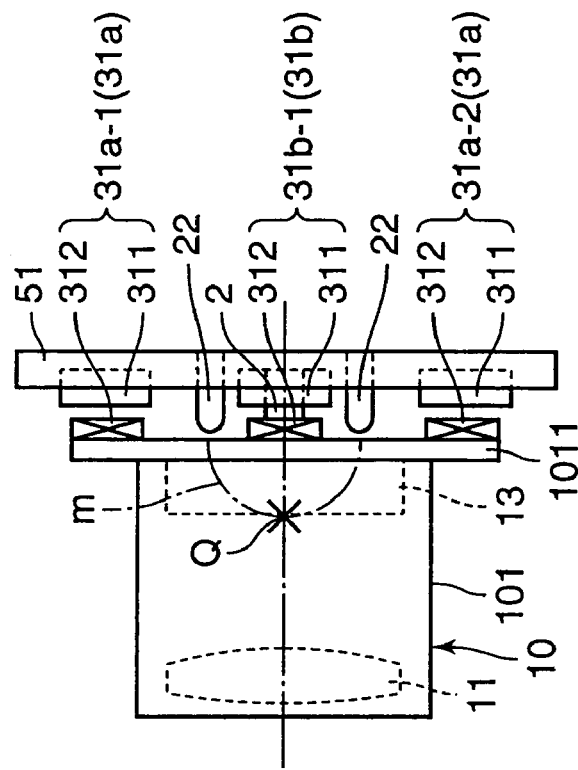
Figure 5B:
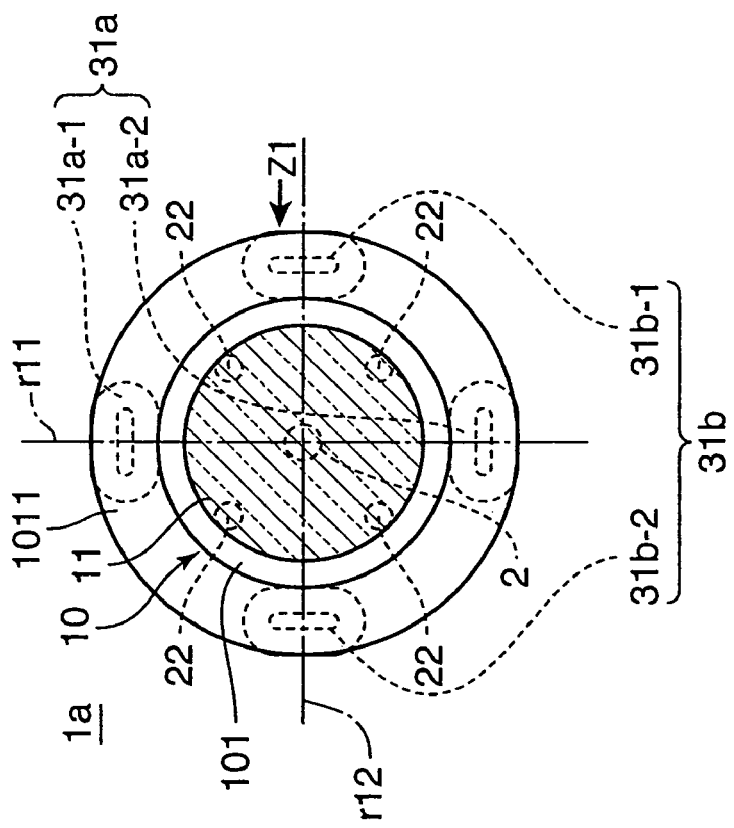

FIGS. 5A and 5B are illustrations showing a shake correction mechanism 1a as a first embodiment of the present invention, in which a lens barrel 10 is supported at one point on a bottom surface thereof by an elastic support member 2. FIG. 5A is a front view of the shake correction mechanism 1a, and FIG. 5B is a side view of the shake correction mechanism 1a as viewed from the direction of the arrow Z1 in FIG. 5A. The shake correction mechanism 1a includes the lens barrel 10, the elastic support member 2 of a support mechanism 2a (see FIG. 6) for oscillatingly supporting the lens barrel 10, a base block 51 serving as an attachment base for the lens barrel 10, and first and second actuator 31a and 31b for applying oscillating forces to the lens barrel 10. In FIG. 5A, illustration of the base block 51 is omitted for sake of simplifying the illustration. Likewise, illustration of a member equivalent to the base block 51 is omitted in FIGS. 6A, 8A, and 9A.

The lens barrel 10 is an integral unit in which an image sensor 13 is integrally provided in a tubular outer body 101 together with a lens array 11. A disc-like flange portion 1011 having a diameter larger than that of the lens barrel 10 is integrally formed with the lens barrel 10 at a rear end thereof to mount coils 312, which will be described later. The configuration of the flange portion 1011 is optionally designed, as far as the flange portion 1011 has a plane on which the coils 312 are mountable. Alternatively, the flange portion 1011 may be omitted, if the coils 312 are mounted in an area defined by the outer perimeter of the outer body 101.

The support mechanism 2a for oscillatingly supporting the lens barrel 10 is disposed on the bottom side of the lens barrel 10, and includes the elastic support member 2 which elastically supports the lens barrel 10 at one point. In this embodiment, the elastic support member 2 is disposed on the same axis as the optical axis of the lens barrel 10, and the centroid Q of the lens barrel 10 is located on the optical axis. Aligning the support point of the lens barrel 10 by the elastic support member 2 and the centroid Q of the lens barrel 10 with the optical axis enables to execute shake correction of the lens barrel 10 accurately and in a well-balanced manner.

Preferably, the elastic support member 2 is made of an elastic material in view of the requirement that the support member 2 be subjected to elastic deformation by application of an oscillating force to the lens barrel 10. Examples of the elastic material are a resin molded product (e.g., polycarbonate) having a vertical modulus of elasticity ranging from about $1\times10^7$ PA to $5\times10^{11}$ PA, and a rubber molded product. Use of the elastic material is advantageous in that the elastic support member 2 retains high responsiveness to oscillation of the lens barrel 10.

The lens barrel 10 is elastically supported at one point on the bottom surface thereof by the elastic support member 2. In this arrangement, the lens barrel 10 is oscillated or swings back and forth about the support point of the lens barrel 10 by the elastic support member 2. Specifically, as described in the section of "Brief Description on the Embodiments", referring to FIG. 1A, the lens barrel 10 has three latitudes of oscillation such that the optical axis of the lens barrel 10 is tilted up and down, leftward and rightward, or is rotated about the optical axis clockwise and counterclockwise. When the lens barrel 10 is oscillated in such a direction as to tilt the optical axis thereof, the elastic support member 2 is subjected to bending deformation, whereas when the lens barrel 10 is oscillated in such a direction as to rotate about the optical axis, the elastic support member 2 is subject to torsional deformation.

Figure 11B:
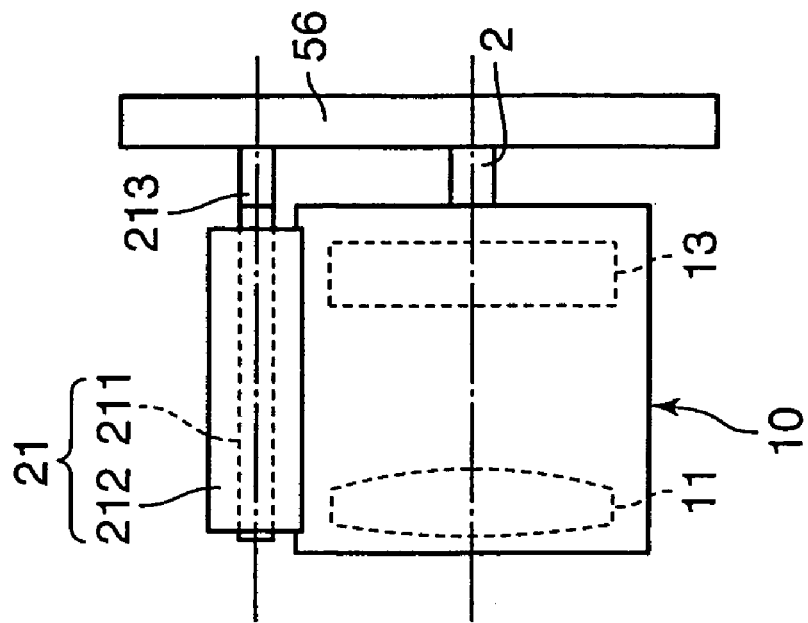
Figure 11A:
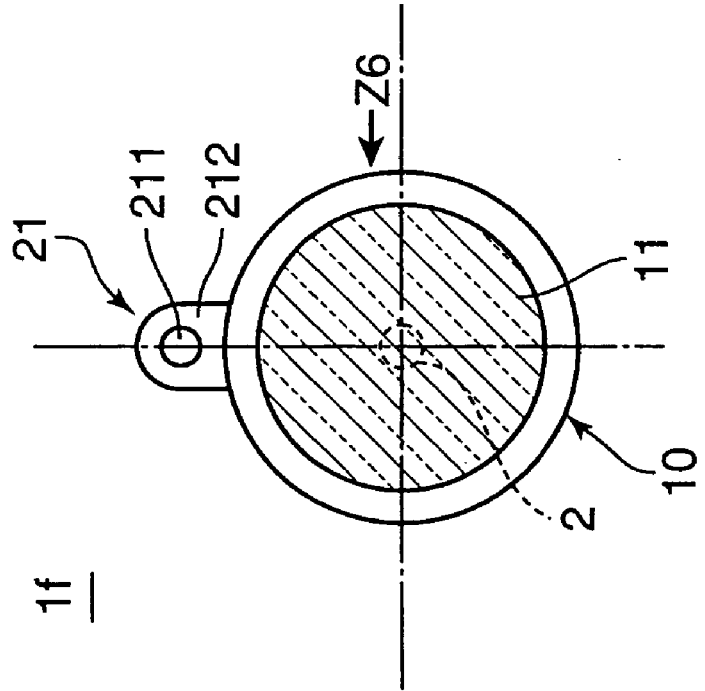

The lens barrel 10 is oscillated in a predetermined direction when an external force is exerted thereon by the actuators 31a and 31b. A rotation oscillation about the optical axis may cause a "rotary displacement" that an image to be photographed by the image sensor 13 is rotatingly displaced due to rotary shake of the camera phone 100, in case that shake correction is conducted with respect to the lens barrel 10 integrally provided with the image sensor 13, as in the present embodiment. In view of this drawback, in the present embodiment, it is desirable to provide a rotation regulating unit for regulating the rotation amount of the lens barrel 10. Although the rotation regulating unit is not shown in FIG. 5, an example of the rotation regulating unit is illustrated in FIGS. 11A and 11B, which will be described later.

The base block 51 is fixed to the first frame 110 of the camera phone 100 at a certain position thereof, and serves as an attachment base (unmovable base) for mounting the lens barrel 10. Specifically, the elastic support member 2 protrudes on the surface of the base block 51, and the bottom surface of the lens barrel 10 is supported on the distal end of the elastic support member 2. With this arrangement, the lens barrel 10 is oscillated relative to the unmovable base block 51. The base block 51 also functions as an attachment base for mounting magnets 311 of the actuators 31a and 31b, and pins 22 serving as tilt regulating members, which will be described later.

It is possible to individually form the lens barrel 10, the elastic support member 2, and the base block 51, and joint these members together as an integral unit. However, it is desirable to form an integral unit constituted of these members in advance, namely, to fabricate the elastic support member 2, part or entirety of the lens barrel 10, and/or part or entirety of the base block 51 into an integrally molded product.

Figure 6:
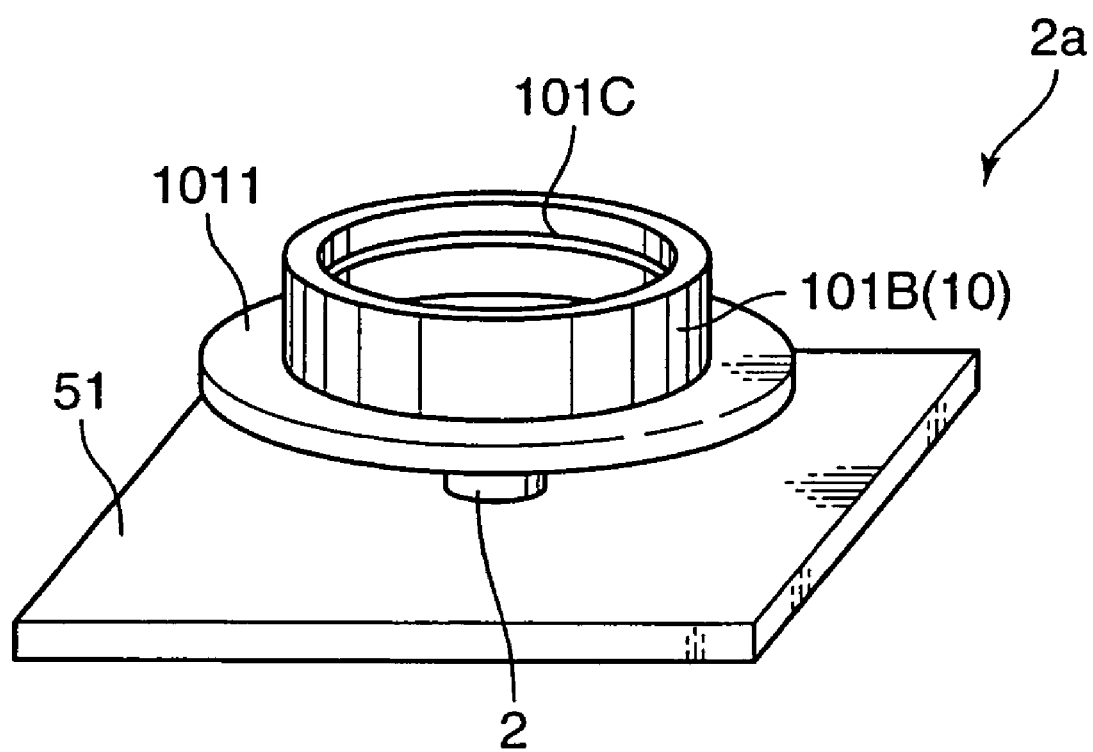
FIG. 6 is a perspective view showing an example of a support mechanism as an integrally molded unit.

FIG. 6 is a perspective view showing an example of the support mechanism 2a as an integrally molded product constituted of the elastic support member 2, the base block 51 and part of the lens barrel 10. In the example of FIG. 6, the elastic support member 2, an outer body bottom portion 101B of the lens barrel 10, and the base block 51 are formed integral. As shown in FIG. 6, the support mechanism 2a is assembled by forming a step-like recessed engaging portion 101C on an inner upper part of the outer body bottom portion 101B and engaging the outer body bottom portion 101B with the main body of the outer body 101 of the lens barrel 10. Thus, fabricating the integrally molded product enables to constitute the support mechanism 2a for oscillatingly supporting the lens barrel 10 relative to the base block 51 substantially without a joint part. This simplifies the construction of the support mechanism 2a and contributes to miniaturization of the support mechanism 2a. The support mechanism 2a can be produced by injection molding with use of a material appropriate for the elastic support member 2, e.g., polycarbonate resin. Elasticity required for the elastic support member 2 can be secured by appropriately setting diameter or the cross-sectional area, in other words, setting the strength of the elastic support member 2 relative to the remaining portion thereof.

A known example of the first actuator 31a and the second actuator 31b is a moving coil actuator. The moving coil actuator, namely, the first actuator 31a (or the second actuator 31b) is comprised of a magnet 311 mounted on the fixed side of the actuator corresponding to the surface of the base block 51, and a coil 312 mounted on the movable side of the actuator corresponding to the bottom surface of the flange portion 1011 of the lens barrel 10. The actuator is operable such that the coil 312 is electromagnetically attracted toward or repelled away from the magnet 311 in response to switching of the energizing direction of the coil 312. The moving amount of the coil 312 toward or away from the magnet 311 is controlled based on the energizing quantity of the coil 312. In view of this, the controlling circuit 45 and the driving circuit 46 (see FIG. 4) generate signals for controlling the energizing direction and the energizing quantity of the coil 312.

Each of the first actuator 31a and the second actuator 31b has a pair of diagonally arranged moving coil units each constituted of the magnet 311 and the coil 312. Specifically, the first actuator 31a has a first moving coil unit 31a-1 and a second moving coil unit 31a-2 arranged symmetrically to each other with respect to the optical axis of the lens barrel 10.

Likewise, the second actuator 31b has a first moving coil unit 31b-1 and a second moving coil unit 31b-2 arranged symmetrically to each other with respect to the optical axis of the lens barrel 10. A straight line r12 connecting the positions of the first and second moving coil units 31b-1 and 31b-2 of the second actuator 31b, and a straight line r11 connecting the positions of the first and second moving coil units 31a-1 and 31a-2 of the first actuator 31a orthogonally intersect with each other. Thus, the four moving coil units with each unit comprised of the magnet 311 and the coil 312 are arranged circumferentially around the optical axis of the lens barrel 10 at an interval of 90°.

The pins 22 serving as the tilt regulating members are arranged on the surface of the base block 51, as opposed to the bottom surface of the lens barrel 10. The pins 22 are provided to regulate the tilt range of the lens barrel 10. As shown in FIG. 5A, the pins 22 are equidistantly arranged to each other, namely, with the distances between the pins 22 and the support point of the lens barrel 10 by the elastic support member 2 identical to each other. The pins 22 substantially define a square shape in plan view with the support point (i.e., the center of oscillation) serving as the center of the square. In this arrangement, tilting of the lens barrel 10 is restrained within the allowable range when the lens barrel 10 is oscillated in any direction.

A certain gap is defined between the distal end of each pin 22 and the bottom surface of the lens barrel 10. An oscillating angle of the lens barrel 10 is determined (regulated) based on the gap, and on the distance between the distal end of each pin 22 and the distal end of the elastic support member 2. Specifically, if the tilt angle of the lens barrel 10 with respect to the optical axis exceeds a predetermined amount while the lens barrel 10 is kept stationary, one of the pins 22 contacts the bottom surface of the lens barrel 10, whereby further tilt of the lens barrel 10 is restrained. The pins 22 are so arranged that the gaps between the distal ends of the pins 22 and the bottom surface of the lens barrel 10 are identical to each other while the lens barrel 10 is kept stationary. In this arrangement, the lens barrel 10 is oscillatingly driven in a desired direction by the first actuator 31a and/or the second actuator 31b with the gap defining an allowable range of oscillation. The gap is determined such that the distal end of each pin 22 does not come into contact with the bottom surface of the lens barrel 10 by ordinary actuating operation of the first and second actuators 31a and 31b.

If a large impact is exerted on the camera phone 100, and the tilt angle of the lens barrel 10 exceeds the predetermined amount arising from oscillation of the lens barrel 10, one of the pins 22 contacts the bottom surface of the lens barrel 10, whereby further tilt of the lens barrel 10 is restrained. This is a function inherently provided to the pins 22. Thanks to this function of the pins 22, the elastic support member 2, which is a mechanically fragile member, is kept from being damaged (being subjected to permanent deformation) arising from an excessively large shake exerted on the lens barrel 10.

In this embodiment, the pins 22 are arranged on an oscillation trajectory m along which the centroid Q of the lens barrel 10 is moved relative to the support point of the lens barrel 10 by the elastic support member 2. Specifically, the pins 22 protrude on the base block 51, so that the contact point of the distal end of each pin 22 and the bottom surface of the lens barrel 10 lies on the oscillation trajectory m along which the centroid Q is moved. Arranging the pins 22 in the above manner makes it possible to allow the pins 22 to directly receive an oscillating force of the lens barrel 10. In this arrangement, secondary oscillation of the lens barrel 10 after collision against the pin 22, namely, oscillation of the lens barrel 10 about the point of collision immediately after the collision against the pin 22, can be effectively suppressed to thereby enhance buffer effect against the impact.

The operation of the shake correction mechanism 1a is described. When photographing by the camera phone 100 is executed in response to output of a shake correction command from a main controller (not shown), the controlling circuit 45 calculates the movement amounts for shake correction of the lens barrel 10, and generates drive signals (drvx, drvy) based on the angular velocity signals detected by the pitch gyro 113 and the yaw gyro 114.

The drive signals (drvx, drvy) are outputted to the driving circuit 46, which, in turn, drives the first actuator 31a and the second actuator 31b, so that the oscillating forces corresponding to the shake correction movement amounts are applied to the lens barrel 10. For instance, an oscillating force to tilt the lens barrel 10 in the direction represented by the straight line r11 connecting the position of the first moving coil unit 31a-1 and the position of the second moving coil unit 31a-2 is applied to the lens barrel 10 by generating an electromagnetic attraction force of attracting the coil 312 of the first moving coil unit 31a-1 constituting the first actuator 31a toward the corresponding magnet 311 through energization of the coil 312 in the forward direction, and simultaneously by generating an electromagnetic repulsion force of retracting the coil 312 of the second moving coil unit 31a-2 constituting the first actuator 31a away from the corresponding magnet 311 through energization of the coil 312 in the reverse direction, or alternatively, by energizing one of the coils 312 of the first and second moving coil units 31a-1 and 31a-2. In other words, the oscillating force is applied to the lens barrel 10 such that the lens barrel 10 is tilted along a first plane which includes the support point of the lens barrel 10 by the elastic support member 2 and extends in the direction of the optical axis of the lens barrel 10 including the straight line r11. Further, the lens barrel 10 is tilted in the direction opposite to the above tilt direction along the first plane by reversing the energizing directions of the coils 312 of the first and second moving coil units 31a-1 and 31a-2 constituting the first actuator 31a.

Likewise, an oscillating force is applied to the lens barrel 10 to tilt the lens barrel 10 in the direction represented by the straight line r12 connecting the position of the first moving coil unit 31b-1 and the position of the second moving coil unit 31b-2 by controlling the energizing direction(s) of the coil 312 of the first moving coil unit 31b-1 and/or the coil 312 of the second moving coil unit 31b-2. In other words, the oscillating force is applied to the lens barrel 10 such that the lens barrel 10 is tilted along a second plane which includes the support point of the lens barrel 10 by the elastic support member 2, intersects perpendicular to the first plane, and extends in the direction of the optical axis of the lens barrel 10 including the straight line r12.

When the aforementioned oscillating forces are applied to the lens barrel 10 by the first actuator 31a and the second actuator 31b, the lens barrel 10 is tilted in a predetermined direction relative to the support point of the lens barrel 10 by the elastic support member 2. At this time, the elastic support member 2 is subjected to elastic deformation due to a moment applied thereto so as to allow the lens barrel 10 to be tilted in the predetermined direction. Namely, the elastic support member 2 is subjected to bending deformation depending on the tilt direction. On the other hand, torsional deformation of the elastic support member 2 about the optical axis is restrained by the unillustrated rotation regulating unit (see FIGS. 11A and 11B). In this way, shake correction for suppressing photographing failure arising from hand shake of the user during photographing is executed by the oscillation of the lens barrel 10.

According to the shake correction mechanism 1a as described in the first embodiment, since the lens barrel is oscillatingly supported without use of a rotary joint or the like as employed in the conventional gimbal mechanism, miniaturization of the shake correction mechanism is feasible. Further, the straight line r11 connecting the positions of the first and second moving coil units 31a-1 and 31a-2 of the first actuator 31a, and the straight line r12 connecting the positions of the first and second moving coil units 31b-1 and 31b-2 of the second actuator 31b orthogonally intersect with each other at the support point (center of the optical axis) of the lens barrel 10 by the elastic support member 2. This arrangement is advantageous in applying an oscillating force to the lens barrel 10 in a well balanced manner, and in controlling the actuators 31a and 31b.

Second Embodiment

FIGS. 7A through 7C are illustrations showing a shake correction mechanism 1b as a second embodiment of the present invention, in which a lens barrel 10 is oscillatingly supported at one point on a bottom surface thereof by an elastic support member 2. FIG. 7A is a front view of the shake correction mechanism 1b, FIG. 7B is a side view of the shake correction mechanism 1b as viewed from the direction of the arrow Z2 in FIG. 7A, and FIG. 7C is an enlarged cross-sectional view of the portion h indicated by the broken circle in FIG. 7B. Similarly to the first embodiment, the shake correction mechanism 1b comprises the lens barrel 10, the elastic support member 2 of a support mechanism for oscillatingly supporting the lens barrel 10, a base block 52 as an attachment base for the lens barrel 10, and first and second actuators 32a and 32b for applying oscillating forces to the lens barrel 10. The second embodiment is different from the first embodiment in that the elastic support member 2 is disposed away from the center of the optical axis of the lens barrel 10, and that a pin 23 serving as a tilt regulating member is arranged at such a position as to be allowed to contact a lead end portion on a side wall of the lens barrel 10. In the following, the second embodiment is described primarily on the features different from those of the first embodiment.

A disc-like flange portion 1012 larger than the lens barrel 10 in diameter is integrally formed with the lens barrel 10 at a rear end portion of the lens barrel 10 to mount coils 312 of moving coil units constituting the first and second actuators 32a and 32b. The flange portion 1012 is eccentric with respect to the optical axis of the lens barrel 10. The elastic support member 2 is jointed to the base block 52 at the center of axis of the flange portion 1012.

Similarly to the first embodiment, the first actuator 32a includes the first moving coil unit 32a-1, and the second moving coil unit 32a-2 symmetrically arranged to each other with respect to the elastic support member 2, and the second actuator 32b includes the first moving coil unit 32b-1, and the second moving coil unit 32b-2 symmetrically arranged to each other with respect to the elastic support member 2. The four coils 312 constituting the moving coil units 32a-1, 32a-2, 32b-1, and 32b-2 are equidistantly arranged on the circumference of the flange portion 1012. In other words, the four coils 312 are mounted on the flange portion 1012 equidistantly at an interval of 90° around the axis of the elastic support member 2 (not around the center of the optical axis of the lens barrel 10). Four magnets 311 are mounted on the base block 52 as opposed to the corresponding coils 312. Thus, the four moving coil units 32a-1, 32a-2, 32b-1, and 32b-2 are constructed.

Similarly to the first embodiment, the tilt regulating member is provided in the second embodiment. In this embodiment, as mentioned above, the pin 23 serving as the tilt regulating member is arranged at such a position as to be allowed to contact the lead end portion on the side wall of the lens barrel 10. The pin 23 is provided at a certain position of a frame member 521 extending in parallel with the optical axis of the lens barrel 10. Specifically, the frame member 521 extends in parallel with the optical axis of the lens barrel 10 away from the side wall thereof by a certain gap, with a base end 521B being fixed to the base block 52. As shown in FIG. 7C, a screw hole 522 is formed in the vicinity of a lead end of the frame member 521, and a threaded portion 231 of the pin 23 is threaded into the screw hole 522. The gap g defined by a distal end surface 232 of the pin 23 and the side wall surface of the lens barrel 10 is determined by regulating the threading of the threaded portion 231 in the screw hole 522.

In the shake oscillation mechanism 1b, when an oscillating force over the gap g is applied to the lens barrel 10, the distal end surface 232 of the pin 23 comes into contact with the side wall surface of the lens barrel 10, thereby restraining further oscillation of the lens barrel 10. In other words, the oscillation range of the lens barrel 10 is determined by the gap g. In the example of FIG. 7B, the single pin 23 is provided. Alternatively, plural pins 23 may be provided. For instance, it is preferable to arrange four pins 23 equidistantly along the circumference of the lens barrel 10.

In the above arrangement, it is desirable to dispose the pin 23 as the tilt regulating member at such a position as to be allowed to contact the lens barrel 10 at or around the farthest point from the support point of the lens barrel 10 by the elastic support member 2. This is because the farther the pin 23 is away from the support point, the easier the control of the oscillation angle is. In view of this, in the second embodiment, the pin 23 is arranged near the lead end of the frame member 521, so that the distal end surface 232 of the pin 23 is allowed to contact the side wall surface of the lens barrel 10 at or around the farthest point from the support point. This arrangement is advantageous in finely adjusting the gap g, i.e., setting the oscillation angle, as compared with the case of arranging the pin near the support point, because the pin 23 is located sufficiently away from the center of oscillation.

The operation of the shake correction mechanism 1b is substantially the same as the operation of the shake correction mechanism 1a in the first embodiment. Specifically, a moment to tilt the lens barrel 10 in the direction represented by the straight line connecting the positions of the first and second moving coil units 32a-1 and 32a-2 is applied to the lens barrel 10 by generating an electromagnetic attraction force of attracting the coil 312 of the first moving coil unit 32a-1 constituting the first actuator 32a toward the corresponding magnet 311 through energization of the coil 312 in the forward direction, and simultaneously by generating an electromagnetic repulsion force of retracting the coil 312 of the second moving coil unit 32a-2 constituting the first actuator 32a away from the corresponding magnet 311 through energization of the coil 312 in the reverse direction, or alternatively, by energizing one of the coils 312 of the first and second moving coil units 32a-1 and 32a-2. The elastic support member 2 is subjected to bending deformation while undergoing the moment. The operation of the second actuator 32b is the same as that of the first actuator 32a. In this way, the lens barrel 10 is oscillated in a desired direction.

According to the shake correction mechanism 1b as described in the second embodiment, since the lens barrel is oscillatingly supported without use of a rotary joint or the like as employed in the conventional gimbal mechanism, miniaturization of the shake correction mechanism is feasible. Further, since the center of the optical axis of the lens barrel 10 is not aligned with the support point of the lens barrel 10 by the elastic support member 2, design freedom is increased, thereby making it easier to mount the shake correction mechanism in the camera phone 100.

Third Embodiment

FIGS. 8A and 8B are illustrations showing a shake correction mechanism 1c as a third embodiment of the present invention. FIG. 8A is a front view of the shake correction mechanism 1c, and FIG. 8B is a side view of the shake correction mechanism 1c as viewed from the direction of the arrow Z3 in FIG. 8A. Similarly to the second embodiment, the shake correction mechanism 1c includes a lens barrel 10, an elastic support member 2 of a support mechanism for oscillatingly supporting the lens barrel 10, a base block 53 as an attachment base for the lens barrel 10, and first and second actuator 33a and 33b for applying oscillating forces to the lens barrel 10. The third embodiment is different from the second embodiment in that the elastic support member 2 is disposed away from the bottom surface of the lens barrel 10.

In the third embodiment, a first flange portion 1013 having a relatively large area, and a second flange portion 1014 having a relatively small area are integrally and radially outwardly formed on a side wall of the lens barrel 10, not in a rear end portion of the lens barrel 10. The elastic support member 2 is interposed between the first flange portion 1013 and the base block 53 to interlock these members. In this arrangement, the bottom surface of the lens barrel 10 and the surface of the base block 53 are arranged in proximity to each other, and the elastic support member 2 is aligned with the rear end portion of the lens barrel 10.

The first flange portion 1013 has three protrusions, namely, a first protrusion 1013a-1, a second protrusion 1013b-1, and a third protrusions 1013b-2. A coil 312 of a first moving coil unit 33a-1 constituting the first actuator 33a is attached to the first protrusion 1013a-1. Coils 312 of a first moving coil unit 33b-1 and a second moving coil unit 33b-2 constituting the second actuator 33b are attached to the second protrusion 1013b-1 and the third protrusion 1013b-2, respectively. A coil 312 of a second moving coil unit 33a-2 constituting the first actuator 33a is attached to the second flange portion 1014. Four magnets 311 are mounted on the surface of the base block 53 as opposed to the corresponding coils 312. Thus, the four moving coil units 33a-1, 33a-2, 33b-1, and 33b-2 are constructed.

The first and second moving coil units 33b-1 and 33b-2 constituting the second actuator 33b are arranged symmetrical to each other with respect to the elastic support member 2. However, the first and second moving coil units 33a-1 and 33a-2 constituting the first actuator 33a are asymmetrical with each other with respect to the elastic support member 2. Specifically, the second moving coil unit 33a-2 is arranged farther away from the elastic support member 2 than the first moving coil unit 33a-1, and a larger load is exerted on the second moving coil unit 33a-2 by oscillation of the lens barrel 10. In view of this, it is desirable to balance the power between the first and second moving coil units 33a-1 and 33a-2 in such a manner that the output power of the second moving coil unit 33a-2 is larger than that of the first moving coil unit 33a-1 by increasing the volume of the coil 312 of the second moving coil unit 33a-2.

Similarly to the second embodiment, in the third embodiment, a frame member 531 with a base end 531B being fixed to the base block 53 is arranged, so that a pin 23 serving as a tilt regulating member is allowed to contact a lead end portion on the side wall of the lens barrel 10 to regulate the tilt range of the lens barrel 10. It is desirable to arrange four pins 23 equidistantly along the circumference of the lens barrel 10. In this embodiment, the bottom surface of the lens barrel 10 and the surface of the base block 53 are arranged in proximity to each other. Accordingly, it may be possible to set the oscillation angle of the lens barrel 10 by adjusting the gap defined by the lens barrel 10 and the base block 53.

The operation of the shake correction mechanism 1c is substantially the same as that of the shake correction mechanism 1b in the second embodiment. Accordingly, description on the operation of the shake correction mechanism 1c is omitted herein. According to the shake correction mechanism 1c as described in the third embodiment, since the elastic support member 2 is disposed away from the bottom surface of the lens barrel 10, the thickness l in the axial direction of the lens barrel 10 can be lessened, as compared with the first and second embodiments. Thereby, the height of the shake correction mechanism 1c can be reduced, which contributes to further miniaturization of the shake correction mechanism. Thus, the arrangement of the third embodiment makes it easier to mount the shake correction mechanism in the camera phone 100 generally having a small thickness.

Fourth Embodiment

FIGS. 9A and 9B are illustrations showing a shake correction mechanism 1d as a fourth embodiment of the present invention, in which a lens barrel 10 is supported by an elastic support member 2 substantially in the axial middle at one point on a side wall thereof. FIG. 9A is a front view of the shake correction mechanism 1d, and FIG. 9B is a side view of the shake correction mechanism 1d as viewed from the direction of the arrow Z4 in FIG. 9A. The shake correction mechanism 1d includes the lens barrel 10, the elastic support member 2 of a support mechanism for oscillatingly supporting the lens barrel 10, a base block 54 as an attachment base for the lens barrel 10, and first and second actuator 34a and 34b for applying oscillating forces to the lens barrel 10. The fourth embodiment is different from the first through third embodiments in that the elastic support member 2 is jointed to the lens barrel 10 in the axial middle on the side wall of the lens barrel 10, and that the base block 54 surrounds the lens barrel 10. In the following, the fourth embodiment is described primarily on these features.

In this embodiment, the lens barrel 10 is surrounded by the base block 54 having four side walls, and is interlocked to the inner wall of the base block 54 by the elastic support member 2 substantially in the axial middle on the side wall of the lens barrel 10. The base block 54 has a square flame-like shape on the plane of FIG. 9A. Specifically, unlike the first through third embodiments in which the lens barrel 10 is supported by the elastic support member 2 at one point on the bottom surface of the lens barrel 10, the lens barrel 10 is supported by the elastic support member 2 at one point on the side wall of the lens barrel 10. The lens barrel 10 also has three latitudes of oscillation in this support mechanism. Specifically, as shown in FIG. 9A, the lens barrel 10 has a latitude of oscillation in the direction represented by a straight line r21, which extends vertically on the plane of FIG. 9A and is orthogonal to the optical axis of the lens barrel 10 (in this case, the elastic support member 2 is subjected to bending deformation), a latitude of oscillation in the direction represented by a straight line r22, which horizontally extends on the plane of FIG. 9 and is orthogonal to the optical axis (in this case, the elastic support member is subjected to torsional deformation), and a latitude of rotation oscillation about the elastic support member 2 in the directions represented by arrows r23 (in this case, the elastic support member 2 is subjected to bending deformation). Among these oscillations, the latitude of oscillation in the directions represented by the arrows r23 is not necessary in shake correction, because the oscillation in the directions represented by the arrows r23 may give rise to a rotary displacement of an image in the arrangement that the image sensor 13 is integrally loaded in the lens barrel 10. Accordingly, it is desirable to provide a rotation regulating unit (see FIGS. 12A and 12B) for restraining the rotation oscillation of the lens barrel 10 in the directions represented by the arrows r23.

Coil mounting portions 1015a-1, 1015a-2, 1015b-1, and 1015b-2 for mounting coils 312 of the first actuator 34a and the second actuator 34b are provided on the side wall of the lens barrel 10. The coil mounting portions 1015a-1 and 1015a-2 are adapted to mount the coils 312 of the first actuator 34a, and are arranged on a lead end portion and a rear end portion of the lens barrel 10, respectively, such that they are symmetrical to each other diagonally with respect to the intersection P at which the normal line from the support point of the lens barrel 10 by the elastic support member 2 intersects with the optical axis, as shown in FIG. 9B.

The coil mounting portions 1015b-1 and 1015b-2 are adapted to mount the coils 312 of the second actuator 34b, and are arranged on the lead end portion and the rear end portion of the lens barrel 10, respectively, such that they are symmetrically to each other diagonally with respect to the intersection P on a plane normal to the plane on which the coil mounting portions 1015a-1 and 1015a-2 are arranged.

The first actuator 34a is constituted of a first moving coil unit 34a-1 and a second moving coil unit 34a-2, each including a magnet 311 and the coil 312. The coil 312 of the first moving coil unit 34a-1 is mounted on the coil mounting portion 1015a-1 formed on the lead end portion of the lens barrel 10, and the coil 312 of the second moving coil unit 34a-2 is mounted on the coil mounting portion 1015a-2 formed on the rear end portion of the lens barrel 10, respectively. The magnets 311 are mounted on the inner walls of the base block 54, as opposed to the corresponding coils 312. Similarly, the coil 312 of the first moving coil unit 34b-1 is mounted on the coil mounting portion 1015b-1 formed on the lead end portion of the lens barrel 10, and the coil 312 of the second moving coil unit 34b-2 is mounted on the coil mounting portion 1015b-2 formed on the rear end portion of the lens barrel 10, respectively. The magnets 311 are mounted on the inner walls of the base block 54, as opposed to the corresponding coils 312. Thus, the four moving coil units 34a-1, 34a-2, 34b-1, and 34b-2 are constructed.

The operation of the shake correction mechanism 1d is described. First, a moment is applied to the lens barrel 10 to tilt the lens barrel 10 in the direction represented by the straight line r21 as shown in FIG. 9A by generating an electromagnetic attraction force of attracting the coil 312 of the first moving coil unit 34a-1 constituting the first actuator 34a toward the corresponding magnet 311 through energization of the coil 312 in the forward direction, and simultaneously by generating an electromagnetic repulsion force of retracting the coil 312 of the second moving coil unit 34a-2 constituting the first actuator 34a away from the corresponding magnet 311 through energization of the coil 312 in the reverse direction, or alternatively, by energization of one of the coils 312 of the first and second moving coil units 34a-1 and 34a-2. When the moment is applied to the lens barrel 10, the elastic support member 2 is subjected to bending deformation, and the lens barrel 10 is oscillated along the plane which includes the straight line r21, and extends in parallel with the optical axis. In other words, the oscillating force is applied to the lens barrel 10 to oscillate the lens barrel 10 along the first plane that includes the support point of the lens barrel 10 by the elastic support member 2, and extends in the direction of the optical axis of the lens barrel 10 including the straight line r21.

Similarly to the operation of the first actuator 34a, when the second actuator 34b is operated, a moment is applied to the lens barrel 10 to tilt the lens barrel 10 in the direction represented by the straight line r22 as shown in FIG. 9A through energization of the coils of the first and second moving coil units 34b-1 and 34b-2. When the moment is applied to the lens barrel 10, the elastic support member 2 is subjected to torsional deformation, and the lens barrel 10 is oscillated along the plane that includes the straight line r22 and extends in parallel with the optical axis. Specifically, the oscillating force is applied to the lens barrel 10 to oscillate the lens barrel 10 along the second plane that includes the optical axis of the lens barrel 10, intersects perpendicular to the first plane, and extends in the direction of the optical axis of the lens barrel 10 including the straight line r22. In this way, the oscillating force is applied to the lens barrel 10 to tilt the optical axis of the lens barrel 10 in a desired direction.

According to the shake correction mechanism 1d as described in the fourth embodiment, since the lens barrel is oscillatingly supported without use of a rotary joint or the like as employed in the conventional gimbal mechanism, miniaturization of the shake correction mechanism is feasible. Further, since the lens barrel 10 is supported at one point on the side wall thereof by the elastic support member 2, the height of the shake correction mechanism 1d can be reduced, which contributes to further miniaturization of the shake correction mechanism.

Fifth Embodiment

FIGS. 10A and 10B are illustrations showing a shake correction mechanism 1e as a fifth embodiment of the present invention, in which a lens barrel 10 is supported at one point substantially in the axial middle on a side wall thereof by an elastic support member 2. FIG. 10A is a front view of the shake correction mechanism 1e, and FIG. 10B is a side view of the shake correction mechanism 1e as viewed from the direction of the arrow Z5 in FIG. 10A. Similarly to the fourth embodiment, the shake correction mechanism 1e includes the lens barrel 10, the elastic support member 2 of a support mechanism for oscillatingly supporting the lens barrel 10, a base block 55 as an attachment base for the lens barrel 10, and first and second actuator 35a and 35b for applying oscillating forces to the lens barrel 10. The fifth embodiment is different from the fourth embodiment in that a lens barrel holding member 6 for holding the lens barrel 10 is additionally provided, and that the first actuator 35a is arranged at a position different from the fourth embodiment.

Similarly to the fourth embodiment, the lens barrel 10 is surrounded by the base block 55 having four side walls, and is interlocked to the inner wall of an upper frame 551 of the base block 55 by way of the elastic support member 2 substantially in the axial middle on the side wall of the lens barrel 10. The base block 55 has a square frame-like shape on the plane of FIG. 10A. Whereas the lens barrel 10 is directly supported by the elastic support member 2 in the fourth embodiment, the lens barrel 10 is indirectly supported by the elastic support member 2 by way of the lens barrel holding member 6 in the fifth embodiment. The lens barrel holding member 6 has a main body 60 as an interlock portion of interlocking the lens barrel 10 to the elastic support member 2, and screw receiving portions 61 which are arranged on both sides of the main body 60. Each of the screw receiving portions 61 is formed with a screw hole. It is desirable to fabricate the lens barrel holding member 6, the elastic support member 2, and the base block 55 (or at least the upper frame 551) into an integrally molded product.

Coil mounting portions 1016a-1, 1016a-2, 1016b-1, and 1016b-2 are provided to mount coils 312 of the first actuator 35a and the second actuator 35b on the outer wall of the lens barrel 10. The coil mounting portions 1016a-1 and 1016a-2 are adapted to mount the coils 312 of the first actuator 35a, and are arranged on a lead end portion and a rear end portion of the lens barrel 10, respectively, as shown in FIG. 10B such that they are in parallel with the optical axis and symmetrical to each other with respect to the normal line from the support point of the lens barrel 10 by the elastic support member 2 to the optical axis. The coil mounting portions 1016b-1 and 1016b-2 are adapted to mount the coils 312 of the second actuator 35b, and are arranged on the lead end portion and the rear end portion of the lens barrel 10, respectively, as shown in FIG. 10B such that they are symmetrical to each other diagonally with respect to the intersection at which the normal line from the support point of the lens barrel 10 by the elastic support member 2 intersects with the optical axis on a plane orthogonal to the plane where the coil mounting portions 1016a-1 and 1016a-2 are arranged.

The first actuator 35a is constituted of a first moving coil unit 35a-1 and a second moving coil unit 35a-2 each including a magnet 311 and the coil 312. The coil 312 of the first moving coil unit 35a-1 is mounted on the coil mounting portion 1016a-1 formed on the lead end portion of the lens barrel 10, and the coil 312 of the second moving coil unit 35a-2 is mounted on the coil mounting portion 1016a-2 formed on the rear end portion of the lens barrel 10, respectively. The magnets 311 are mounted on the inner walls of the base block 55, as opposed to the corresponding coils 312.

Similarly, the second actuator 35b is constituted of a first moving coil unit 35b-1 and a second moving coil unit 35b-2, and the coil 312 of the first moving coil unit 35b-1 is mounted on the coil mounting portion 1016b-1 formed on the lead end portion of the lens barrel 10, and the coil 312 of the second moving coil unit 35b-2 is mounted on the coil mounting portion 1016b-2 formed on the rear end portion of the lens barrel 10, respectively. The magnets 311 are mounted on the inner walls of the base block 54, as opposed to the corresponding coils 312. Thus, the four moving coil units 35a-1, 35a-2, 35b-1, and 35b-2 are constructed.

Further, flange portions 103a and 103b each formed with a screw through-hole are formed on the side wall of the lens barrel 10 away from each other by 90° around the optical axis. The screw through-holes formed in the flange portions 103a and 103b, and the screw holes formed in the screw receiving portions 61 of the lens barrel holding member 6 are identical to each other in configuration. The lens barrel 10 and the lens barrel holding member 6 are made integral by screwing screws 61a, 61b into the screw through-holes and the screw holes.

The operation of the shake correction mechanism 1e is described. First, a moment is applied to the lens barrel 10 to tilt the lens barrel 10 in the direction represented by the straight line r31 as shown in FIG. 10A by generating an electromagnetic attraction force of attracting the coil 312 of the first moving coil unit 35a-1 constituting the first actuator 35a toward the corresponding magnet 311 through energization of the coil 312 in the forward direction, and simultaneously, by generating an electromagnetic repulsion force of retracting the coil 312 of the second moving coil unit 35a-2 constituting the first actuator 35a away from the corresponding magnet 311 through energization of the coil 312 in the reverse direction, or alternatively, by energization of one of the coils 312 of the first and second moving coil units 35a-1 and 35a-2. When the moment is applied to the lens barrel 10, the elastic support member 2 is subjected to bending deformation through transmission of the moment to the elastic support member 2 by way of the lens barrel holding member 6. Thus, the lens barrel 10 is oscillated along the plane that includes the straight line r31 and extends in parallel with the optical axis.

Similarly to the operation of the first actuator 35a, when the second actuator 35b is operated, a moment is applied to the lens barrel 10 to tilt the lens barrel 10 in the direction represented by a straight line r32 as shown in FIG. 10A through energization of the coils of the first and second moving coil units 35b-1 and 35b-2. When the moment is applied to the lens barrel 10, the elastic support member 2 is subjected to torsional deformation through transmission of the moment to the elastic support member 2 by way of the lens barrel holding member 6. Thus, the lens barrel 10 is oscillated along the plane that includes the straight line r32 and extends in parallel with the optical axis. In this way, the oscillating force is applied to the lens barrel 10 to tilt the optical axis of the lens barrel 10 in a desired direction.

According to the shake correction mechanism 1e as described in the fifth embodiment, similarly to the fourth embodiment, the height of the shake correction mechanism 1e can be reduced, which contributes to further miniaturization of the shake correction mechanism. In addition to this, the lens barrel 10 is indirectly supported by way of the lens barrel holding member 6. This arrangement simplifies the interlock structure of interlocking the elastic support member 2 to the lens barrel 10. Furthermore, since the lens barrel 10 is supported by the elastic support member 2 by way of the lens barrel holding member 6, it is easy to integrally mold the elastic support member 2 together with an adjoining part, which contributes to production cost reduction and miniaturization.

(Embodiments on Rotation Regulating Member)

FIGS. 11A and 11B are illustrations showing a shake correction mechanism if provided with a rotation regulating unit 21 for regulating the rotation amount of a lens barrel 10, as a modification of the present invention. FIG. 11A is a front view of the shake correction mechanism 1f, and FIG. 11B is a side view of the shake correction mechanism 1f as viewed from the direction of the arrow Z6 in FIG. 11A. Similarly to the first through third embodiments, the shake correction mechanism 1f is constructed such that the lens barrel 10 is supported by an elastic support member 2 at one point on the bottom surface thereof onto a base block 56. Illustration of an actuator for oscillating the lens barrel 10 is omitted.

The rotation regulating unit 21 is adapted to restrain rotation oscillation (oscillation in the directions shown by the arrows c in FIG. 1A) of the lens barrel 10 about an axis parallel with the optical axis of the lens barrel 10, which is an unnecessary latitude of oscillation in the arrangement that the lens barrel 10 is supported at one point on the bottom surface thereof. The rotation regulating unit 21 includes a shaft member 211 which extends axially from the base block 56 by way of an elastic support member 213, and a shaft receiving member (guide member) 212 which is formed on a side wall of the lens barrel 10 and extends in the direction parallel with the optical axis.

The elastic support member 213 is made of an elastic material as in the case of the elastic support member 2, and pivotally supports the shaft member 211. The shaft member 211 is passed in a through-hole formed in the shaft receiving member 212 such that the shaft member 211 is operable to thrust in and out of the shaft receiving member 212. The inner diameter of the shaft receiving member 212 is slightly larger than the outer diameter of the shaft member 211 to allow the thrust movement. In this arrangement, in the case where an oscillating force is applied to the lens barrel 10 to tilt the optical axis thereof in the directions shown by the arrows a and b in FIG. 1A by an unillustrated actuator, the oscillation is allowed while allowing the thrust movement, because the lens barrel 10 and the shaft member 211 are linked in parallel with each other.

On the other hand, if an oscillating force is applied to the lens barrel 10 to rotate the lens barrel 10 about the axis parallel with the optical axis, the rotation oscillation is restrained, because the shaft member 211 is engaged in the through-hole of the shaft receiving member 212 which is integrally formed with the lens barrel 10 in a state that one end of the shaft member 212 is fixed to the unmovable base block 56 via the elastic support member 213, namely, at a position away from the elastic support member 2.

Thus, providing the rotation regulating unit 21 enables to restrain the rotation oscillation about the axis parallel with the optical axis without affecting the oscillation of the lens barrel 10 to tilt the optical axis of the lens barrel 10. Thereby, shake correction of the lens barrel 10 integrally loaded with the image sensor 13 is executed securely without causing a rotary displacement of an image to be photographed, because the rotation oscillation is restrained.

Figure 12B:
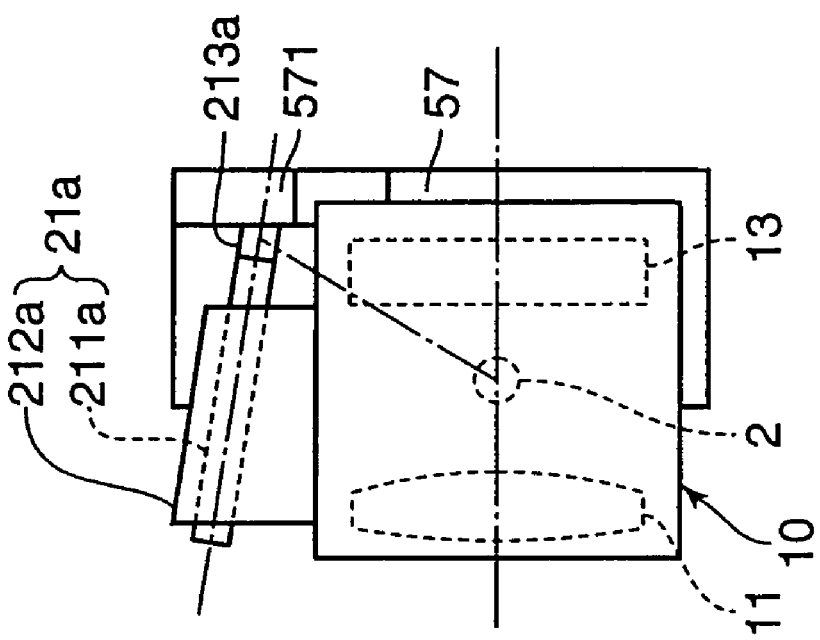
Figure 12A:
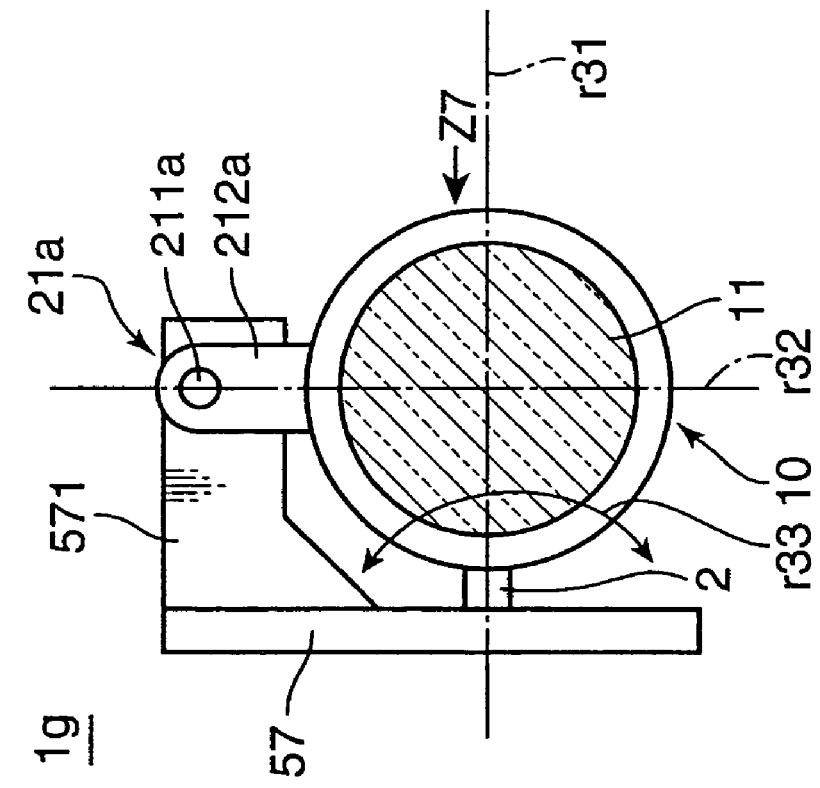

FIGS. 12A and 12B are illustrations showing a shake correction mechanism 1g provided with a rotation regulating unit 21a for regulating the rotation amount of a lens barrel 10, as a further modification of the present invention. FIG. 12A is a front view of the shake correction mechanism 1g, and FIG. 12B is a side view of the shake correction mechanism 1g as viewed from the direction of the arrow Z7 in FIG. 12A. Similarly to the fourth and fifth embodiments, the shake correction mechanism 1g is constructed such that the lens barrel 10 is supported by an elastic support member 2 at one point substantially in the axial middle on a side wall of the lens barrel 10 onto a base block 57. Illustration of an actuator for oscillating the lens barrel 10 is omitted.

The rotation regulating unit 21a is adapted to restrain rotation oscillation of the lens barrel 10 about the elastic support member 2 in the directions shown by arrows r33 in FIG. 12A (oscillation in the directions shown by the arrows r23 in FIG. 9A), which is an unnecessary latitude of oscillation in the arrangement that the lens barrel 10 is supported at one point on the side wall thereof. The rotation regulating unit 21a includes a shaft member 211a which extends in a certain direction, by way of an elastic support member 213a, from a frame member 571 which extends vertically from the base block 57, and a shaft receiving member (guide member) 212a which is formed on a side wall of the lens barrel 10 and extends in a direction away from the optical axis by a predetermined angle.

The arrangement shown in FIGS. 12A and 12B is the same as that in FIGS. 11A and 11B in that: the elastic support member 213a is made of an elastic material as in the case of the elastic support member 2; the shaft member 211a is pivotally supported; and the shaft member 211a is passed in a through-hole formed in the shaft receiving member 212a such that the shaft member 211a is operable to thrust in and out of the shaft receiving member 212a. In this arrangement, in the case where an oscillating force is applied to the lens barrel 10 to tilt the optical axis thereof in the directions represented by the straight lines r31 and r32 in FIG. 12A by an unillustrated actuator, the oscillation of the lens barrel 10 is allowed while allowing the thrust movement, because the lens barrel 10 and the shaft member 211a are linked in parallel with each other.

On the other hand, if an oscillating force is applied to the lens barrel 10 to rotate the lens barrel 10 about the elastic support member 2 in the directions shown by the arrows r33, the rotation oscillation is restrained, because the shaft member 211a is engaged in the through-hole of the shaft receiving member 212a which is integrally formed with the lens barrel 10 in a state that one end of the shaft member 211a is fixed to the frame member 571 integrally formed with the unmovable base block 57 via the elastic support member 213a, namely, at a position away from the elastic support member 2.

Thus, providing the rotation regulating unit 21a enables to restrain the rotation oscillation about the elastic support member 2 without affecting the oscillation of the lens barrel 10 to tilt the optical axis of the lens barrel 10. Thereby, shake correction of the lens barrel 10 integrally loaded with the image sensor 13 is securely executed without causing a rotary displacement of an image to be photographed, because the rotation oscillation is restrained.

As mentioned above, the present invention can take the various embodiments and modifications. For instance, in the embodiments, the moving coil actuator is described as an example of the actuator. Other examples of the actuator include an actuator incorporated with a small electric motor, and a gear mechanism, a ball screw mechanism, or a like mechanism, an actuator incorporated with a piezoelectric element, and an actuator incorporated with a pressure mechanism.

An example of the rotation regulating unit 21 is the structural member including the shaft member 211 and the shaft receiving member 212. As far as the thrust movement in the direction of the optical axis of the lens barrel 10 is allowable, any arrangement on the rotation regulating unit 21 is applicable. For instance, a guide member having a C-shape in cross section may be attached to the lens barrel 10, in place of the shaft receiving member 212. Further alternatively, the shaft member 211 may be attached to the lens barrel 10 via the elastic support member 213, and the shaft receiving member 212 may extend from the base block 56.

In the embodiments, the moving coil unit as an example of the actuator is constructed such that the coil 312 is attached to the lens barrel 10, and the magnet 311 is attached to the base block. Conversely, the coil 312 may be attached to the base block, and the magnet 311 may be attached to the lens barrel 10.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A shake correction mechanism comprising:
    a lens barrel that holds a lens system and an image sensor, wherein the image sensor converts an optical image formed by the lens system into an electrical signal;
    a support mechanism that includes an elastic support member that elastically supports the lens barrel at only one point thereof, wherein the support mechanism oscillatingly supports the lens barrel;
    an actuator unit that applies an oscillating force to the lens barrel; and
    a tilt regulating member that regulates a tilt range of the lens barrel with respect to the optical axis of the lens barrel, wherein:
        the lens barrel is operative to tilt at least an optical axis thereof when an oscillating force is applied to the lens barrel by the actuator unit,
        the elastic support member is subjected to elastic deformation when the oscillating force is applied to the lens barrel by the actuator unit,
        the elastic support member supports the lens barrel whereby the lens barrel swings in at least two directions different from each other about a support point of the lens barrel, and
        the tilt regulating member includes a pin that is arranged as opposed to a part of the lens barrel for contact with the part of the lens barrel, and the pin is arranged on an oscillation trajectory along which a centroid of the lens barrel is moved relative to the support point of the lens barrel by the elastic support member.

2. The shake correction mechanism according to claim 1, further comprising a rotation regulating unit that regulates a rotation amount of the lens barrel about an axis parallel with the optical axis of the lens barrel, the axis including the support point of the lens barrel by the elastic support member.

3. The shake correction mechanism according to claim 2, further comprising an unmovable base block wherein the rotation regulating unit includes a shaft member and a guide member that guides the shaft member, and the shaft member is pivotally supported on the base block or the lens barrel, and the shaft member is integrally formed with an outer wall of the lens barrel or the base block.

4. The shake correction mechanism according to claim 1, wherein the lens barrel is supported by the elastic support member at one point on a bottom surface thereof, and the actuator unit includes a first actuator that oscillates the lens barrel along a first plane which includes the support point of the lens barrel by the elastic support member and extends in a direction of the optical axis of the lens barrel, and a second actuator that oscillates the lens barrel along a second plane which includes the support point of the lens barrel by the elastic support member and intersects perpendicular to the first plane.

5. The shake correction mechanism according to claim 4, further comprising a base block as an attachment base for the lens barrel, wherein the first actuator and the second actuator each comprises a moving coil unit including a magnet and a coil, either one of the magnet and the coil of the moving coil unit is attached to a flange portion formed on a rear end portion of the lens barrel, and the other one of the coil and the magnet of the moving coil unit is attached to the base block.

6. The shake correction mechanism according to claim 4, wherein the support point of the lens barrel by the elastic support member is disposed away from the bottom surface of the lens barrel.

7. The shake correction mechanism according to claim 1, wherein the lens barrel is supported by the elastic support member at one point substantially in an axial middle on a side wall thereof, and the actuator unit includes a first actuator that oscillates the lens barrel along a first plane which includes the support point of the lens barrel by the elastic support member and the optical axis of the lens barrel, and extends in a direction of the optical axis of the lens barrel, and a second actuator that oscillates the lens barrel along a second plane which includes the optical axis of the lens barrel and intersects perpendicular to the first plane.

8. The shake correction mechanism according to claim 7, further comprising a base block as an attachment base for the lens barrel, the base block having a frame-like shape in plan view and surrounding the lens barrel, wherein the first actuator and the second actuator each comprises a moving coil unit including a magnet and a coil, either one of the magnet and the coil of the moving coil unit is attached to a mounting portion formed on the side wall of the lens barrel, and the other one of the coil and the magnet of the moving coil unit is attached to an inner wall of the base block.

9. The shake correction mechanism according to claim 1, further comprising a lens barrel holding member that holds the lens barrel thereon, wherein the lens barrel holding member is elastically supported by the elastic support member.

10. An image sensing apparatus comprising:
a main body of the image sensing apparatus;
an image sensing section including a lens barrel that holds a lens system and an image sensor, wherein the image sensor converts an optical image formed by the lens system into an electrical signal;
a swing angle detector that detects a swing angle of the lens barrel relative to the main body;
a shake correction controller that generates a shake correction control signal based on the detected swing angle; and
a shake correction mechanism controlled by the shake correction controller, wherein the shake correction mechanism comprising:
the lens barrel;
a support mechanism that includes an elastic support member that elastically supports the lens barrel at only one point thereof, wherein the support mechanism oscillatingly supports the lens barrel;
an actuator unit that applies an oscillating force to the lens barrel; and
a tilt regulating member that regulates a tilt range of the lens barrel with respect to the optical axis of the lens barrel, wherein:
the lens barrel is operative to tilt at least an optical axis thereof when an oscillating force is applied to the lens barrel by the actuator unit,
the elastic support member is subjected to elastic deformation when the oscillating force is applied to the lens barrel by the actuator unit,
the elastic support member supports the lens barrel whereby the lens barrel swings in at least two directions different from each other about a support point of the lens barrel, and
the tilt regulating member includes a pin that is arranged as opposed to a part of the lens barrel for contact with the part of the lens barrel, and the pin is arranged on an oscillation trajectory along which a centroid of the lens barrel is moved relative to the support point of the lens barrel by the elastic support member.

11. A shake correction mechanism comprising:
a lens barrel that holds a lens system and an image sensor, wherein the image sensor converts an optical image formed by the lens system into an electrical signal;
a support mechanism that includes an elastic support member that elastically supports the lens barrel at only one point thereof, wherein the support mechanism oscillatingly supports the lens barrel; and
an actuator unit that applies an oscillating force to the lens barrel; and
a tilt regulating member that regulates a tilt range of the lens barrel with respect to the optical axis of the lens barrel, wherein:
the lens barrel is operative to tilt at least an optical axis thereof when an oscillating force is applied to the lens barrel by the actuator unit,
the elastic support member is subjected to elastic deformation when the oscillating force is applied to the lens barrel by the actuator unit, and
the elastic support member supports the lens barrel whereby the lens barrel swings in at least two directions different from each other about a support point of the lens barrel, and,
the tilt regulating member includes a pin that is arranged as opposed to the part of the lens barrel for contact with the part of the lens barrel at or around a point farthest away from the support point of the lens barrel by the elastic support member.

12. The shake correction mechanism according to claim 11, further comprising a rotation regulating unit that regulates a rotation amount of the lens barrel about an axis parallel with the optical axis of the lens barrel, the axis including the support point of the lens barrel by the elastic support member.

13. The shake correction mechanism according to claim 12, further comprising an unmovable base block wherein the rotation regulating unit includes a shaft member and a guide member that guides the shaft member, and the shaft member is pivotally supported on the base block or the lens barrel, and the shaft member is integrally formed with an outer wall of the lens barrel or the base block.

14. The shake correction mechanism according to claim 11, wherein the lens barrel is supported by the elastic support member at one point on a bottom surface thereof, and the actuator unit includes a first actuator that oscillates the lens barrel along a first plane which includes the support point of the lens barrel by the elastic support member and extends in a direction of the optical axis of the lens barrel, and a second actuator that oscillates the lens barrel along a second plane which includes the support point of the lens barrel by the elastic support member and intersects perpendicular to the first plane.

15. The shake correction mechanism according to claim 14, further comprising a base block as an attachment base for the lens barrel, wherein the first actuator and the second actuator each comprises a moving coil unit including a magnet and a coil, either one of the magnet and the coil of the moving coil unit is attached to a flange portion formed on a rear end portion of the lens barrel, and the other one of the coil and the magnet of the moving coil unit is attached to the base block.

16. The shake correction mechanism according to claim 14, wherein the support point of the lens barrel by the elastic support member is disposed away from the bottom surface of the lens barrel.

17. The shake correction mechanism according to claim 11, wherein the lens barrel is supported by the elastic support member at one point substantially in an axial middle on a side wall thereof, and the actuator unit includes a first actuator that oscillates the lens barrel along a first plane which includes the support point of the lens barrel by the elastic support member and the optical axis of the lens barrel, and extends in a direction of the optical axis of the lens barrel, and a second actuator that oscillates the lens barrel along a second plane which includes the optical axis of the lens barrel and intersects perpendicular to the first plane.

18. The shake correction mechanism according to claim 17, further comprising a base block as an attachment base for the lens barrel, the base block having a frame-like shape in plan view and surrounding the lens barrel, wherein the first actuator and the second actuator each comprises a moving coil unit including a magnet and a coil, either one of the magnet and the coil of the moving coil unit is attached to a mounting portion formed on the side wall of the lens barrel, and the other one of the coil and the magnet of the moving coil unit is attached to an inner wall of the base block.

19. The shake correction mechanism according to claim 11, further comprising a lens barrel holding member that holds the lens barrel thereon, wherein the lens barrel holding member is elastically supported by the elastic support member.

20. An image sensing apparatus comprising:
a main body of the image sensing apparatus;
an image sensing section including a lens barrel that holds a lens system and an image sensor, wherein the image sensor converts an optical image formed by the lens system into an electrical signal;
a swing angle detector that detects a swing angle of the lens barrel relative to the main body;
a shake correction controller that generates a shake correction control signal based on the detected swing angle; and
a shake correction mechanism controlled by the shake correction controller, wherein the shake correction mechanism comprising:
the lens barrel;
a support mechanism that includes an elastic support member that elastically supports the lens barrel at only one point thereof, wherein the support mechanism oscillatingly supports the lens barrel;
an actuator unit that applies an oscillating force to the lens barrel; and
a tilt regulating member that regulates a tilt range of the lens barrel with respect to the optical axis of the lens barrel, wherein:
the lens barrel is operative to tilt at least an optical axis thereof when an oscillating force is applied to the lens barrel by the actuator unit,
the elastic support member is subjected to elastic deformation when the oscillating force is applied to the lens barrel by the actuator unit,
the elastic support member supports the lens barrel whereby the lens barrel swings in at least two directions different from each other about a support point of the lens barrel, and
the tilt regulating member includes a pin that is arranged as opposed to the part of the lens barrel for contact with the part of the lens barrel at or around a point farthest away from the support point of the lens barrel by the elastic support member.

* * * * *

UNITED STATES PATENT AND TRADEMARK OFFICE
CERTIFICATE OF CORRECTION

PATENT NO. : 7,623,159 B2  Page 1 of 1
APPLICATION NO. : 10/990864
DATED : November 24, 2009
INVENTOR(S) : Wada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 850 days.

Signed and Sealed this

Twenty-sixth Day of October, 2010

David J. Kappos
*Director of the United States Patent and Trademark Office*